US007877156B2

(12) United States Patent
Fujimoto et al.

(10) Patent No.: US 7,877,156 B2
(45) Date of Patent: Jan. 25, 2011

(54) AUDIO REPRODUCING APPARATUS, AUDIO REPRODUCING METHOD, AND PROGRAM

(75) Inventors: Kazuo Fujimoto, Osaka (JP); Tomoyuki Okada, Nara (JP); Taro Katayama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1148 days.

(21) Appl. No.: 11/547,305

(22) PCT Filed: Apr. 5, 2005

(86) PCT No.: PCT/JP2005/006685

§ 371 (c)(1),
(2), (4) Date: Oct. 4, 2006

(87) PCT Pub. No.: WO2005/098854

PCT Pub. Date: Oct. 20, 2005

(65) Prior Publication Data

US 2008/0037151 A1 Feb. 14, 2008

(30) Foreign Application Priority Data

Apr. 6, 2004 (JP) ............................. 2004-112224

(51) Int. Cl.
 *G06F 17/00* (2006.01)
 *H04B 1/00* (2006.01)
(52) U.S. Cl. ........................................ 700/94; 381/119
(58) Field of Classification Search .................... 381/61, 381/80, 119, 22–23; 700/94; 386/54, 65, 386/66; 704/500–504; 369/3, 4; 463/35; 352/1, 11, 12, 22, 25, 37
See application file for complete search history.

(56) References Cited

U.S. PATENT DOCUMENTS

| 5,995,706 A | | 11/1999 | Iijima et al. |
| 6,016,295 A | * | 1/2000 | Endoh et al. ............. 369/47.16 |
| 6,044,307 A | * | 3/2000 | Kamiya ....................... 700/94 |

(Continued)

FOREIGN PATENT DOCUMENTS

DE 24 56 642 8/1976

(Continued)

*Primary Examiner*—Xu Mei
(74) *Attorney, Agent, or Firm*—Wenderoth, Lind & Ponack, L.L.P.

(57) ABSTRACT

This invention provides an audio reproducing apparatus which reproduces plural digital audio signals and synchronizes them with each other. The audio reproducing apparatus includes a synchronization setting unit 11 which synchronizes the plural audio signals by allocating, on a time axis, plural pieces of audio reproduction time information of the audio signals and in a manner which maintains a difference between reproduction times indicated by adjacent pieces of the audio reproduction time information of each of the audio signals, and an audio synthesis unit 6 which synthesizes the plural audio signals using the plural pieces of the audio reproduction time information allocated on the time axis.

2 Claims, 19 Drawing Sheets

U.S. PATENT DOCUMENTS

| | | |
|---|---|---|
| 6,094,638 A | 7/2000 | Ema et al. |
| 6,778,756 B1 * | 8/2004 | Fujimura et al. ............... 386/52 |
| 7,283,197 B2 * | 10/2007 | Rodigast et al. ............... 352/12 |
| 7,706,544 B2 * | 4/2010 | Melchior et al. ............... 381/18 |
| 7,738,772 B2 * | 6/2010 | Okada et al. .................. 386/68 |
| 2003/0229679 A1 | 12/2003 | Yoo et al. |
| 2004/0199276 A1 * | 10/2004 | Poon ........................... 700/94 |
| 2005/0058307 A1 * | 3/2005 | Yang et al. .................. 381/119 |
| 2007/0083278 A1 * | 4/2007 | Poon ........................... 700/94 |
| 2007/0142944 A1 * | 6/2007 | Goldberg et al. ............... 700/94 |

FOREIGN PATENT DOCUMENTS

| | | |
|---|---|---|
| EP | 0 536 959 | 4/1993 |
| EP | 0 896 498 | 2/1999 |
| EP | 0 911 829 | 4/1999 |
| JP | 5-101608 | 4/1993 |
| JP | 5-266634 | 10/1993 |
| JP | 6-62500 | 3/1994 |
| JP | 7-296519 | 11/1995 |
| JP | 9-288866 | 11/1997 |
| JP | 10-145735 | 5/1998 |
| JP | 10-243349 | 9/1998 |
| JP | 10-340542 | 12/1998 |
| JP | 11-53841 | 2/1999 |
| JP | 11-120705 | 4/1999 |
| JP | 11-328863 | 11/1999 |
| JP | 2000-228054 | 8/2000 |
| JP | 2001-36863 | 2/2001 |
| JP | 2003-257125 | 9/2003 |
| WO | 03/096175 | 11/2003 |

* cited by examiner

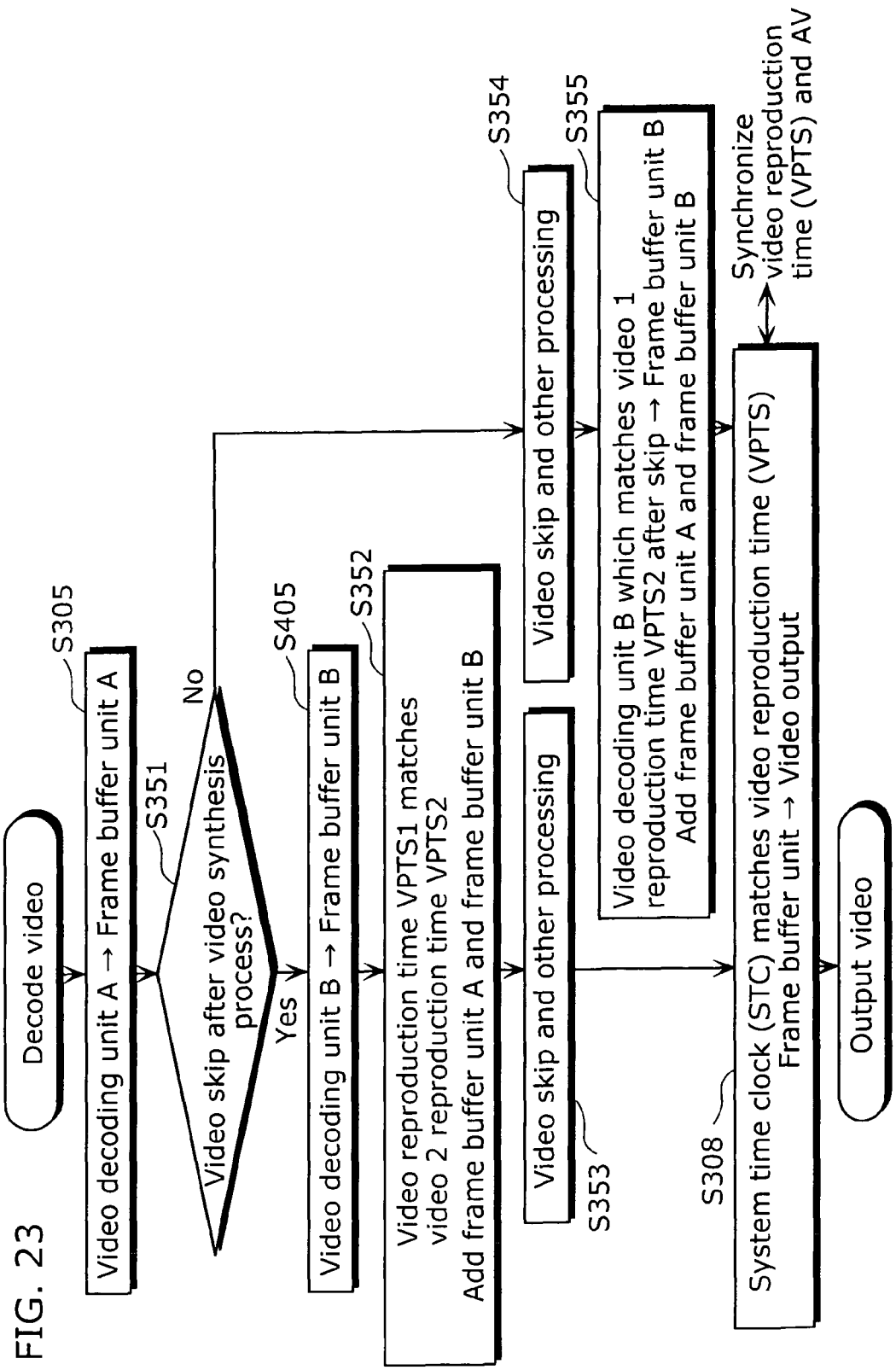

AUDIO REPRODUCING APPARATUS, AUDIO REPRODUCING METHOD, AND PROGRAM

TECHNICAL FIELD

The present invention relates to an audio reproducing apparatus for reproducing a compression-coded digital audio signal.

BACKGROUND ART

In recent years, a reproducing apparatus has come to be widely used in which the digital audio signal and the digital video signal recorded in compressed form in various recording media such as CD-ROM, DVD-ROM and hard disk are read and decompressed, and the decompressed signal is reproduced through a display and a speaker or the like connected thereto.

An apparatus for recording and reproducing the digital audio signal and the digital video signal in compressed form for the BS digital broadcast, the CS digital broadcast, the digital terrestrial broadcast or the like has also come to be widely used.

MPEG is known as a standard for coding and compressing the audio signal and the video signal into a digital signal and subsequently decoding the signal. In MPEG, the multiplexed and compression-coded audio signal and video signal are decoded, after which the audio signal and the video signal are reproduced in synchronism with each other. For this purpose, information (hereinafter referred to as the "time information") on the time of execution of the signal reproduction and display is added to each of the audio signal and the video signal at the time of coding, and then the signals are compressed. As a result, in the case where the compression-coded digital audio signal and video signal are decompressed, the reproducing apparatus reproduces the audio signal and the video signal in synchronism with each other by referring to the time information based on the system time clock value contained in the reproducing apparatus.

A conventional reproducing method is explained below. Note that the applicant acknowledges the method of reproducing the image and the sound disclosed in Patent Document 1, and to clarify the problem to be solved by the present invention, the reproducing method disclosed in Patent Document 1 is explained briefly as a prior art. According to this method, in order to reproduce first and second images having different imaging angles, a video signal corresponding to each angle is decoded by being inputted in a different video decoding unit and the images decoded independently of each other are combined and displayed on a single screen. As to the audio signal, plural audio signals are similarly reproduced by being decoded at the same time by different audio decoding means independently of each other.

The conventional audio reproducing method is explained below with reference to FIG. 1. FIG. 1 is a block diagram showing a configuration of a dual audio decoder 183 for carrying out the reproducing method. With reference to FIG. 1, a specific configuration of the dual audio decoder 183 is explained. The dual audio decoder 183 includes a first audio decoder 183a, a second audio decoder 183b, a first audio selection circuit 183c and a second audio selection circuit 183d. In the case where two audio signals of Japanese and English are reproduced at the same time, for example, the first audio signal constituting the signal of the voice in Japanese is inputted to the first audio decoder 183a and decoded. At the same time, the second audio signal constituting the signal of the voice in English is inputted to the second audio decoder 183b and decoded.

The first and second audio signals thus decoded are processed by the first audio selection circuit 183c and the second audio selection circuit 183d. In the case where one each of left and right channels are available as audio output channels, for example, the first and second audio signals are processed so as to be outputted through one channel each in monaural mode, or only one of the first and second audio signals is processed to be outputted in two-channel stereo. In the case where the audio output channels are more than one each of left and right channels, the first and second audio signals are processed to be outputted in a combination of stereo and monaural modes and the like.

Further, with regard to the audio data of (5+1) channel configuration of Dolby digital system, the first audio selection circuit 183c and the second audio selection circuit 183d can output two channels each in stereo for (5+1) channels that can be outputted or can selectively output only the (5+1) channels of one of the audio data.

Patent Document 1: Japanese Laid-Open Patent Application No. Hei 10-145735 (pp. 10-11, FIGS. 4, 8 and 9)

DISCLOSURE OF INVENTION

Problems that Invention is to Solve

In Patent Document 1, a method is described in which the data from plural angles are decoded by plural video decoding means, and the decoded data are displayed by being combined by video data combining means. Also, in Patent Document 1, a method is explained in which in the case where plural pieces of audio data of different languages are added to the video data, each audio data is decoded by plural audio decoding means, mixed and reproduced, and a method in which any of the audio data is selected and reproduced.

Patent Document 1, however, contains no specific description about detailed implementation means for mixing the two types of data and means for establishing synchronism for reproduction. As far as the sound is concerned, nothing is explained about the mixing method and the mixing ratio of the audio data in the case where the two types of audio data to be reproduced have different sampling rates, or a mixing method, a mixing section and the synchronization of the audio data, the audio data such as the surround sound and the stereo sound having different numbers of channels.

Assume, for example, that the sound to be reproduced is the multiple sounds of DVD with the first sound compression coded by the Dolby digital system and the second sound coded by the linear PCM. If the first sound as the surround sound of 5.1 ch at the sampling rate of 48 KHz and the second sound as the stereo sound of 2 ch at the sampling rate of 96 KHz are to be mixed with each other, the process for matching the sampling rate of one of the sounds and the process for setting an object to be mixed are required.

In any way, in the case where plural digital audio signals are synthesized and reproduced, the plural audio signals are required to be reproduced in synchronism with each other. No means for realizing such a reproduction have existed in the past.

Taking the above-mentioned problem into consideration, the object of the present invention is to provide an audio reproducing apparatus for reproducing plural digital audio signals in synchronism with each other.

Means to Solve the Problems

The audio reproducing apparatus of the first present invention is an audio reproducing apparatus that reproduces an audio signal and outputs the reproduced audio signal, and which includes: a synchronization unit operable to synchronize plural audio signals by allocating, on a time axis, plural pieces of the audio reproduction time information of each of the audio signals, the plural pieces of the audio reproduction time information being allocated in a manner which maintains a difference between reproduction times indicated by adjacent pieces of the audio reproduction time information of each of the audio signals; and a synthesis unit operable to synthesize the plural audio signals using the plural pieces of audio reproduction time information allocated on the time axis. As described above, with the audio reproducing apparatus according to the present invention, plural pieces of audio reproduction time information of plural audio signals are allocated on a single time axis, and therefore plural digital audio signals can be reproduced in synchronism with each other.

The audio reproducing apparatus of the second present invention is an audio reproducing apparatus, wherein the time axis is a time axis identified by the plural pieces of the audio reproduction time information of one of the plural audio signals, and the synchronization unit allocates, on the time axis identified by the plural pieces of the audio reproduction time information of one of the plural audio signals, the plural pieces of audio reproduction time information of other audio signals. As described above, plural voices can be synchronized with each other by matching the audio reproduction time information of other audio signals with the audio reproduction time information of the main audio signal.

The audio reproducing apparatus of the third present invention is an audio reproducing apparatus, wherein the time axis is a time axis identified by the plural pieces of the audio reproduction time information of one of the plural audio signals in which variable speed reproduction is performed. Even in the case of the variable speed reproduction, the apparatus produces an effect of synchronizing plural audio signals by the decoding operation taking advantage of the audio reproduction time information of the audio signals reproduced at variable speed.

The audio reproducing apparatus of the fourth present invention is an audio reproducing apparatus, wherein the plural audio signals are multiplexed with a video signal, the time axis is a time axis identified by plural pieces of video reproduction time information of the video signal, and the synchronization unit allocates, on the time axis identified by the plural pieces of the video reproduction time information, the plural pieces of the audio reproduction time information of each of the audio signals. This apparatus functions to assure audio synchronization in accordance with the output of the reproduced image.

The audio reproducing apparatus of the fifth present invention is an audio reproducing apparatus, wherein the time axis is a time axis identified by the plural pieces of the video reproduction time information of the video signal in which variable speed reproduction is performed. This apparatus functions to assure audio synchronization for the reproduced image at the time of skip in accordance with the video output reproduced by skip.

The audio reproducing apparatus of the sixth present invention is an audio reproducing apparatus, wherein the time axis is a time axis identified by a variable-speed system clock reference signal. This apparatus functions to synchronize the image and the voice by changing the system time clock signal providing a reference for the whole system.

The audio reproducing apparatus of the seventh present invention further includes a sampling rate conversion unit that converts, in accordance with a sampling rate of one of the plural audio signals, a sampling rate of another audio signal, wherein the synthesis unit synthesizes the one of the plural audio signals and the another audio signal converted by the sampling rate conversion unit. In this way, plural voices can be reproduced in accordance with the sampling rate of one voice. In the case where the type of audio, namely, main audio or sub-audio such as a commentary is recorded in the contents itself, the user can hear plural voices at a predetermined sampling rate regardless of the presence or absence of the commentary or the like by reproducing the plural voices in accordance with the sampling rate of the main audio.

The audio reproducing apparatus of the eighth present invention is an audio reproducing apparatus, wherein the one of the plural audio signals is an audio signal having a longest continuous reproduction section among the plural audio signals. The sub-audio such as the commentary including the comments on a specified scene may be inserted for the purpose of complementing the main audio, and assumed to be shorter in voice reproduction section than the main audio. As a result, the number of times the sampling rate is changed midway can be reduced by selecting the longer reproduction section.

The audio reproducing apparatus of the ninth present invention is an audio reproducing apparatus, wherein the one of the plural audio signals is an audio signal having a least intermittent audio reproduction section among the plural audio signals. In the case where the voice having the commentary reproduction section intermittent for each scene is reproduced with the voice having the least intermittent audio reproduction section as a main signal, for example, the number of times the sampling rate is changed midway can be reduced by changing the rate in such a manner the sampling rate of the intermittent audio signal matches the least intermittent audio signal (including the audio signal not intermittent).

The audio reproducing apparatus of the tenth present invention is an audio reproducing apparatus, wherein the one of the plural audio signals is an audio signal having a highest sampling rate among the plural audio signals. This apparatus functions to hold the sound quality as far as possible by leaving the high quality voice as it is while up-sampling the other voices.

The audio reproducing apparatus of the eleventh present invention is an audio reproducing apparatus, wherein the one of the plural audio signals is an audio signal having a lowest sampling rate among the plural audio signals. This apparatus functions to reduce the data amount for the audio transmission by changing to a low sampling rate in the case where the transmission band for audio output is limited, for example.

The audio reproducing apparatus of the twelfth present invention is an audio reproducing apparatus, wherein the one of the plural audio signals is an audio signal having an unchanged sampling rate among the plural audio signals. In the case where the sampling rate is changed midway, the audio mute operation may be required at the rate reproduction change point. This functions to select no rate change mainly and hold the continuous audio reproduction.

The audio reproducing apparatus of the thirteenth present invention further includes an output level adjustment unit that reduces a reproduction output level of one of the audio signals only in a portion where another audio signal is added in the case where the plural audio signals are synthesized by adding the another audio signal to the one of the audio signals. As a result, the voice added to can be heard emphatically. In the case where it is desired to listen carefully to the synthesized audio commentary, for example, this functions to increase the reproduction voice level of the audio commentary and reduce the reproduction voice level of the main audio.

The audio reproducing apparatus of the fourteenth present invention is an audio reproducing apparatus, wherein the output level adjustment unit reduces the reproduction output level of the one of the audio signals by an increase in a reproduction output level of another audio signal in the case of synthesizing the one of the audio signals to another audio signal when a user designates the higher reproduction output level of another audio signal. This apparatus functions to prevent the situation in which one of the audio signals is increased in volume while adding the other audio signal having the unchanged volume, a voice distortion such as the voice clipping occurs in a part of the added voice and makes the voice very difficult to listen to.

The audio reproducing apparatus of the fifteenth present invention further includes a unification and distribution unit that unifies or distributes the number of reproduction signal channels of another audio signal in accordance with the number of reproduction signal channels of one of the audio signals. This functions to implement the addition to the channel of a specified audio signal without causing any voice distortion even in the case where the number of reproduction channels of the mutual reproduction signals is different.

The audio reproducing apparatus of the sixteenth present invention further includes a unification and distribution unit that unifies or distributes the number of reproduction signal channels of each of the audio signals in accordance with the number of channels of an audio output apparatus connected to the audio reproducing apparatus. In this way, the number of the reproduction signal channels is unified or distributed for voice synthesis in accordance with the number of channels (for example, the number of speaker connections) of the audio output unit of the user.

The audio reproducing apparatus of the seventeenth present invention is an audio reproducing apparatus, wherein the unification and distribution unit unifies or distributes the number of the reproduction signal channels of each of the audio signals in accordance with an audio output designated channel of the audio output apparatus by the user. This apparatus functions to unify or distribute the number of the reproduction signal channels in accordance with the number of channels (the number of speaker connections, for example) to be reproduced in the voice output unit of the user.

Also, the present invention can be implemented as an audio reproducing method having the characteristic units of the aforementioned audio reproducing apparatus as steps, and as a program causing a computer to execute such steps. The program can be distributed via a recording medium, such as a CD-ROM, and via a transmission medium, such as a communication network.

EFFECTS OF THE INVENTION

The present invention can provide an audio reproducing apparatus for reproducing plural digital audio signals in synchronism with each other. Specifically, the audio reproducing apparatus according to the present invention can execute the process of mixing plural audio signals having different sampling rates or different coding schemes and synchronously reproducing plural audio signals in the variable speed reproduction.

BRIEF DESCRIPTION OF DRAWINGS

FIG. 23 is a flowchart showing the synchronous reproducing method for plural images according to a fourth embodiment.

NUMERICAL REFERENCES

1 Input unit
2 Audio buffer unit A
3 Audio buffer unit B
4 Audio decoding unit A
5 Audio decoding unit B
6 Audio synthesis unit
7 Rate conversion unit
8 Addition ratio processing unit A
9 Addition ratio processing unit B
10 Addition output unit

BEST MODE FOR CARRYING OUT THE INVENTION

The best mode for carrying out the present invention is explained below with reference to the drawings.

First Embodiment

Figure 1:
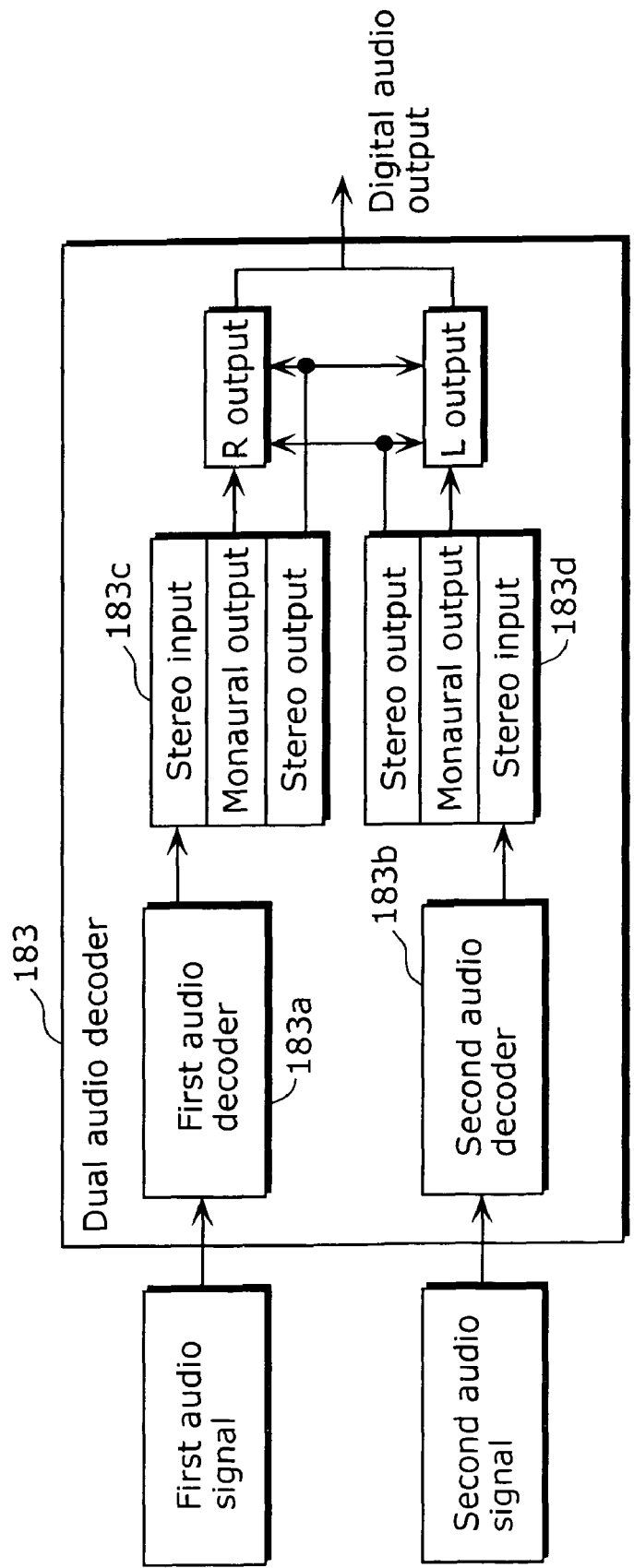
FIG. 1 is a configuration diagram of a dual audio decoder for executing the conventional audio reproducing method.
Figure 2:
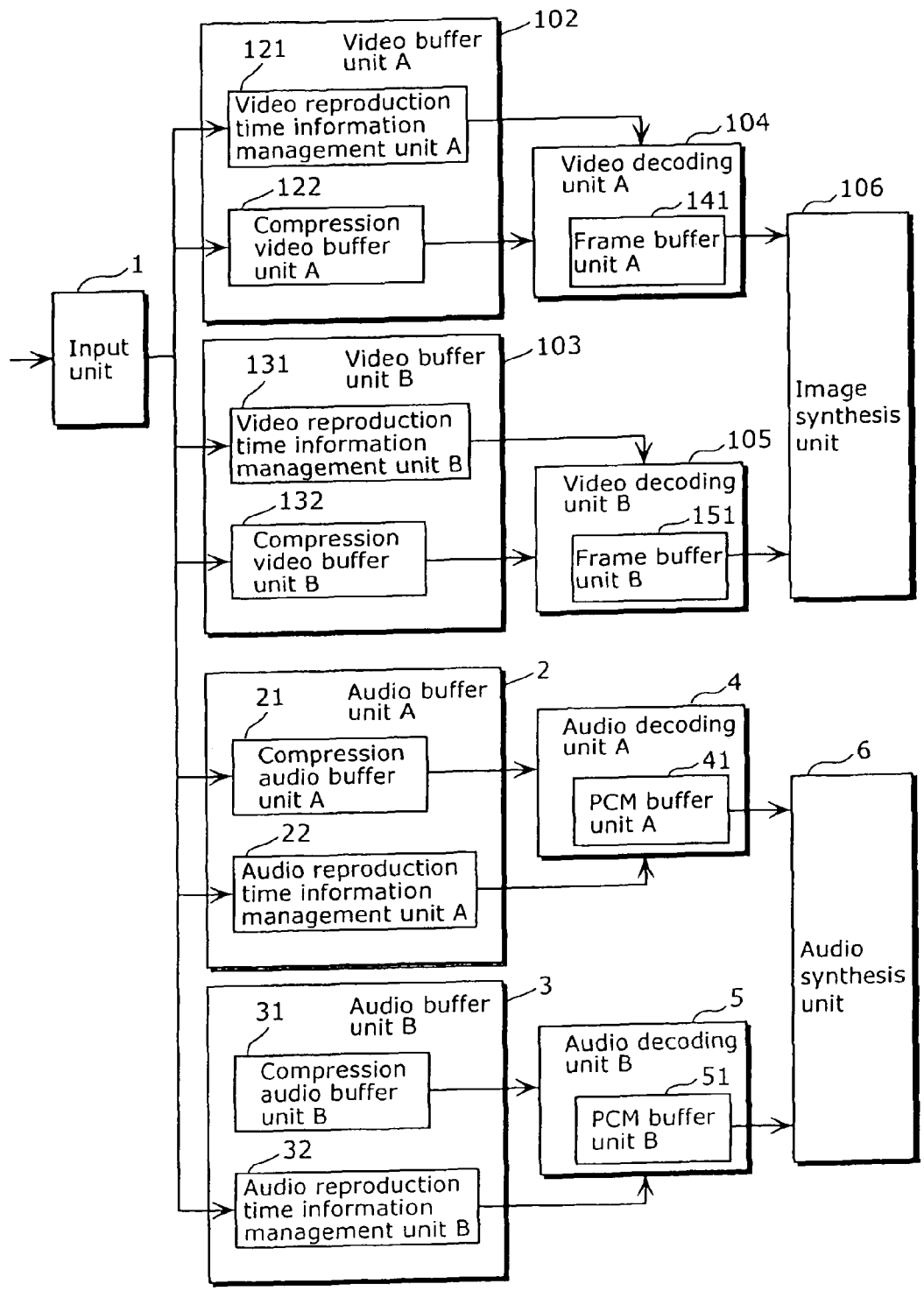
FIG. 2 is a block diagram showing a configuration of an audio-visual reproducing apparatus according to a first embodiment.

First, mainly with reference to the block diagram of FIG. 2 showing a configuration of an audio-visual reproducing apparatus according to a first embodiment, the configuration of the audio-visual reproducing apparatus and a video reproducing method and an audio reproducing method according to the first embodiment are explained. Incidentally, the present invention concerns a technique for reproducing plural digital audio signals in synchronism with each other. Before explaining this technique in detail, the technique for reproducing a multiplexed signal of the video signal and the audio signal is explained.

FIG. 2 is a block diagram showing a configuration of the audio-visual reproducing apparatus according to the first embodiment. The audio-visual reproducing apparatus according to the first embodiment is for reproducing the multiplexed signal of the video signal and the audio signal, and as shown in FIG. 2, is configured of an input unit 1, a video buffer unit A102, a video buffer unit B103, a video decoding unit A104, a video decoding unit B105, an image synthesis unit 106, an audio buffer unit A2, an audio buffer unit B3, an audio decoding unit A4, an audio decoding unit B5 and an audio synthesis unit 6.

The video buffer unit A102, the video buffer unit B103, the video decoding unit A104, the video decoding unit B105 and the image synthesis unit 106 are units for processing the video signal. The audio buffer unit A2, the audio buffer unit B3, the audio decoding unit A4, the audio decoding unit B5 and the audio synthesis unit 6 are units for processing the audio signal.

The input unit 1 is a unit for receiving the multiplexed audio signal and video signal from a data recording device or the like (not shown) such as an optical disk for storing the contents coded by the various coding schemes and the digital audio signal and video signal compression coded for the digital broadcast, or the like. Also, the input unit 1 splits the multiplexed audio signal and video signal into a video signal and an audio signal, and extracts the video reproduction time information from the video signal while extracting the audio reproduction time information from the audio signal. According to the first embodiment, the video signal and the audio signal inputted to the input unit 1 are each assumed to be a 2-channel signal. Thus, the input unit 1 splits the multiplexed audio signal and video signal into a video signal and an audio signal for each channel.

Next, the video buffer unit A102, the video buffer unit B103, the video decoding unit A104, the video decoding unit B105 and the image synthesis unit 106 for processing the video signal are explained.

The video buffer unit A102 is a unit for storing the video signal of the first channel separated by the input unit 1. The video buffer unit A102 includes a video reproduction time information management unit A121 for storing the video reproduction time information in the video signal of the first channel, and a compression video buffer unit A122 for storing the compressed video data in the video signal of first channel. The video reproduction time information management unit A121 has a table for relating the compressed video data of the first channel and the video reproduction time information of the first channel to each other.

The video buffer unit B103 is a unit for storing the video signal of the second channel separated by the input unit 1. The video buffer unit B103 includes a video reproduction time information management unit B131 for storing the video reproduction time information in the video signal of the second channel and a compression video buffer unit B132 for storing the compressed video data of the video signal of the second channel. The video reproduction time information management unit B131 has a table for relating the compressed video data of the second channel and the video reproduction time information of the second channel to each other.

The video decoding unit A104 is a unit for analyzing the attribute information (video header information) of the compressed video data of the first channel stored in the compression video buffer unit A122, and expanding the compressed video data in accordance with the video reproduction time information stored in the video reproduction time information management unit A121. The video decoding unit A104 has a frame buffer unit A141 for storing the expanded video data.

The video decoding unit B105 is a unit for analyzing the attribute information (video header information) of the compressed video data of the second channel stored in the compression video buffer unit B132 and expanding the compressed video data in accordance with the video reproduction time information stored in the video reproduction time information management unit B131. The video decoding unit B105 has a frame buffer unit A151 for storing the expanded video data.

The image synthesis unit 106 is a unit for synthesizing the video data expanded by the video decoding unit A104 and the video decoding unit B105, and outputting it to an external display unit.

Next, the audio buffer unit A2, the audio buffer unit B3, the audio decoding unit A4, the audio decoding unit B5 and the audio synthesis unit 6 for processing the audio signal are explained.

The audio buffer unit A2 is a unit for storing the audio signal of the first channel separated by the input unit 1. The audio buffer unit A2 is configured of a compression audio buffer unit A21 for storing the compressed audio data in the audio signal of the first channel and an audio reproduction time information management unit A22 for storing the audio reproduction time information in the audio signal of the first channel. The audio reproduction time information management unit A22 has a table for relating the compressed audio data of the first channel and the audio reproduction time information of the first channel to each other.

The audio buffer unit B3 is a unit for storing the audio signal of the second channel separated by the input unit 1. The audio buffer unit B3 is configured of a compression audio buffer unit B31 for storing the compressed audio data in the audio signal of the second channel and an audio reproduction time information management unit B32 for storing the audio reproduction time information in the audio signal of the second channel. The audio reproduction time information management unit B32 has a table for relating the compressed audio data of the second channel and the audio reproduction time information of the second channel to each other.

The audio decoding unit A4 is a unit for analyzing the attribute information (video header information) of the compressed audio data of the first channel stored in the compression audio buffer unit A21 and expanding the compressed audio data in accordance with the audio reproduction time information stored in the audio reproduction time information management unit A22. The audio decoding unit A4 has a PCM buffer unit A41 for storing the expanded audio data.

The audio decoding unit B5 is a unit for analyzing the attribute information (video header information) of the compressed audio data of the second channel stored in the compression audio buffer unit B31, and expanding the compressed audio data in accordance with the audio reproduction time information stored in the audio reproduction time information management unit B32. The audio decoding unit B5 has a PCM buffer unit B51 for storing the expanded audio data.

The audio synthesis unit 6 is a unit for synthesizing the audio data expanded by the audio decoding unit A4 and the audio decoding unit B5 and outputting it to an external speaker.

In MPEG, in order to output the video data and the audio data in synchronism with each other, the video signal and the audio signal have added thereto, for each decoding and reproducing unit called an access unit (every frame for the video data, and every audio frame for the audio data), the time stamp information indicating when to decode and reproduce the unit. This time stamp information is called the presentation time stamp (PTS), which is called the video PTS (hereinafter referred to as "VPTS") for video application and the audio PTS (hereinafter referred to as "APTS") for audio application. They indicate the time management information of the output of each video frame and each audio frame.

The audio-visual reproducing apparatus includes a system reference access unit, though not shown in FIG. 2. The system reference access unit is a unit for generating the system time clock (STC) in the reference decoder of the MPEG system. The system reference access unit, in order to prepare the system time clock STC, uses the system clock reference (SCR: system time clock reference value) for the program stream (PS) used in DVD or the like, or the program clock reference (PCR: program time clock reference value) for the transport stream (TS) used in the BS digital broadcast. The system reference access unit sets the reference time by setting the same value as the value indicated by SCR or PCR as the system time clock STC upon the arrival (read time) of the last byte of each stream.

Incidentally, the audio-visual reproducing apparatus can have the system time clock STC having a clock frequency completely matching the reference time system clock by providing a phase lock loop (PLL) circuit and combining the setting of the system time clock STC value with the PLL circuit. The system clock of the system time clock STC is configured of 27 MHz. By frequency dividing the system time clock STC by a counter or the like, each PTS (90 KHz period) can be accessed. Each decoder of the video decoding unit A104, the video decoding unit B105, the audio decoding unit A4 and the audio decoding unit B5 outputs an access unit in the case where the system time clock STC matches the video reproduction time information VPTS for the video data and with the audio reproduction time information APTS for the audio data. The accuracy of the system time clock STC is 90 KHz. Thus, an output with AV synchronization can be produced in the case where each decoder reproduces each reproduction unit in such a manner that the system time clock STC is synchronized with the video reproduction time information VPTS and the audio reproduction time information APTS within the accuracy range of 90 KHz.

Figure 3:
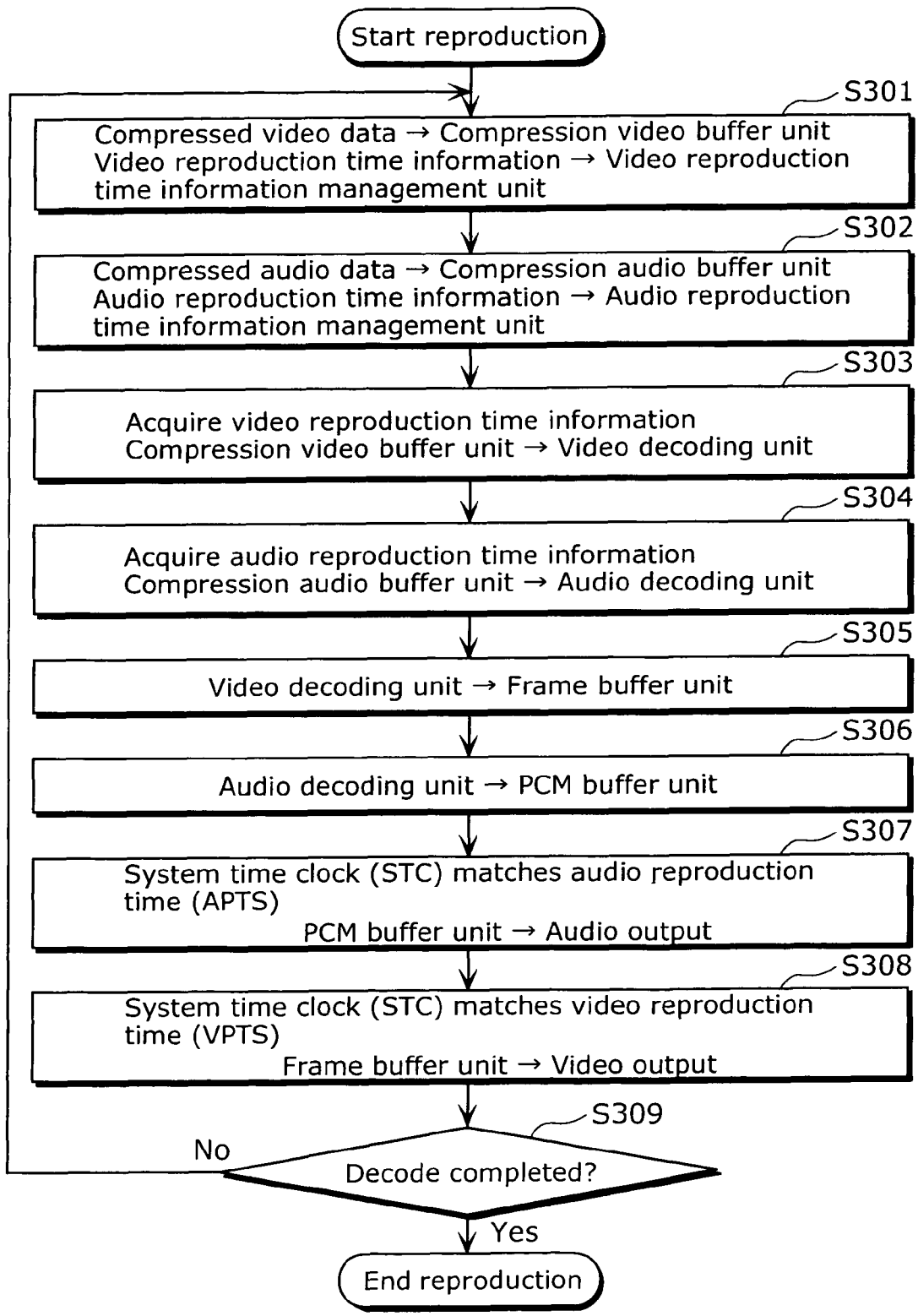
FIG. 3 is a flowchart showing a synchronous reproduction method of the image and the voice according to the first embodiment.

FIG. 3 is a flowchart showing the AV synchronization process. To simplify the explanation, assume that the video stream and the audio stream of one channel are multiplexed (the case in which the video stream and the audio stream of two channels are multiplexed is explained later).

In steps 301 and 302, the input unit 1 separates the coded data from the data recording unit or the like into the compressed video data, the video reproduction time information VPTS, the compressed audio data and the audio reproduction time information APTS.

The compression video buffer unit A122 stores the compressed video data, and the video reproduction time information management unit A121 stores the video reproduction time information VPTS (step 301). In the process, the video reproduction time information management unit A121 stores the video reproduction time information VPTS together with the address of each compressed video data in the compression video buffer unit A122.

Figure 4:
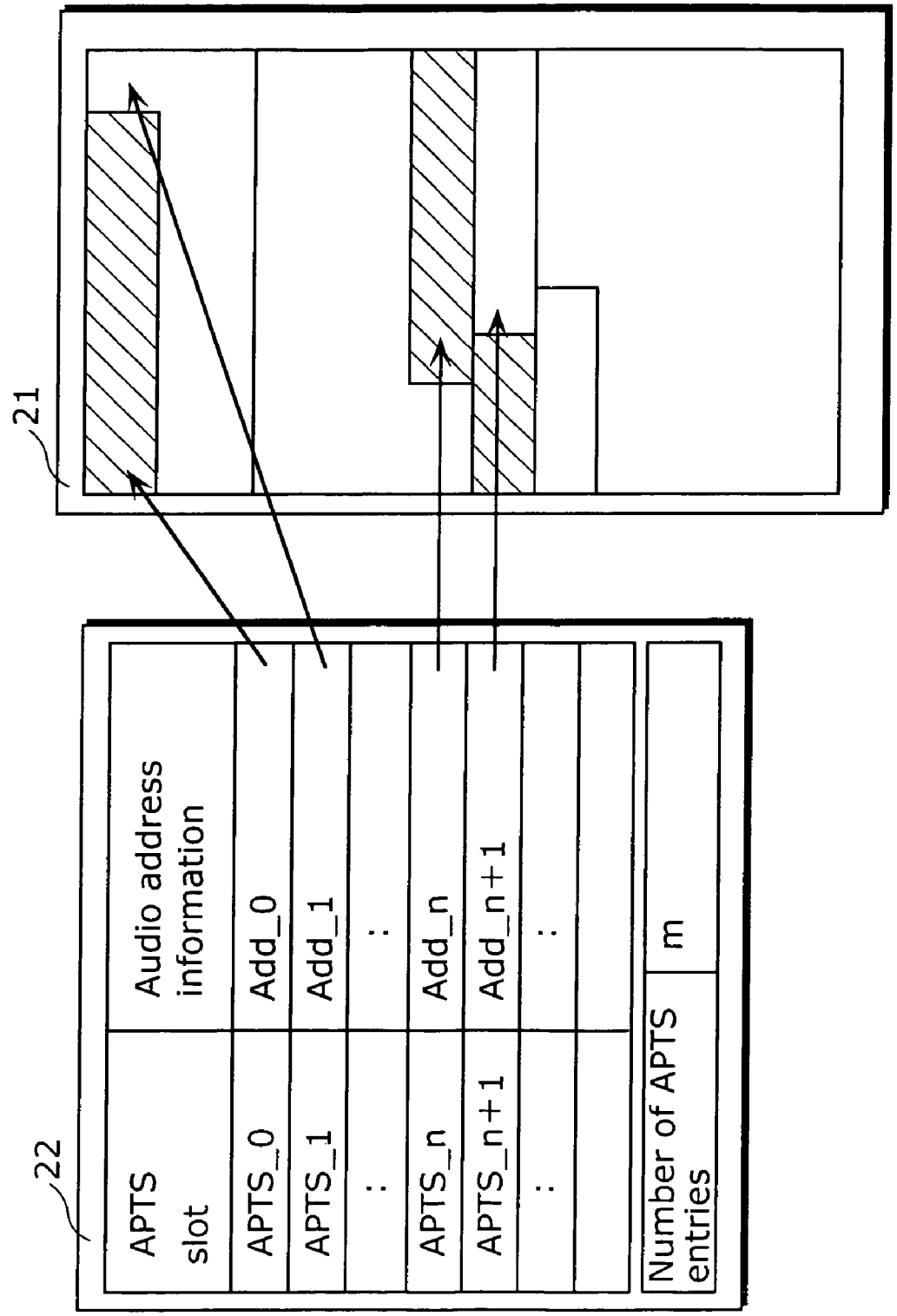
FIG. 4 is a diagram for explaining a method of storing the audio reproduction data according to an embodiment.

The compression audio buffer unit A21 stores the compressed audio data, and the audio reproduction time information management unit A22 stores the audio reproduction time information APTS (step 302). In the process, the audio reproduction time information management unit A22, as shown in FIG. 4, divides the audio reproduction time information APTS in units called slots, and stores it together with the address of each audio data in the compression audio buffer unit A21. As a result, the audio reproduction time information management unit A22 stores the value of the audio reproduction time information APTS and the pointer of the address at which the related compressed audio data is stored.

Incidentally, steps 301 and 302 are changed in sequence appropriately in accordance with the order in which the video signal and the audio signal are inputted to the input unit 1.

The compression audio buffer unit A21 has a write pointer for moving the latest write position to the last point at which the data is written. Also, the compression audio buffer unit A21 has a read pointer for specifying the read position of the compressed audio data. The position of the read pointer is updated as the audio decoding unit A4 reads the compressed audio data. Also, the compression audio buffer unit A21 is a ring-shaped storage unit in which as long as the data is written to the last address, the write position is returned to the first address. Therefore, the next data can be written to the position at which the data is read, and the write operation of the compressed audio data can be managed by the input unit 1 while preventing the write pointer from passing the read pointer.

Next, the video decoding unit A104 acquires the compressed video data from the compression video buffer unit A122, and acquires the video reproduction time information VPTS from the video reproduction time information management unit A121 (step 303). The audio decoding unit A4 acquires the compressed audio data from the compression audio buffer unit A21, and acquires the audio reproduction time information APTS from the audio reproduction time information management unit A22 (step 304).

The video decoding unit A104 carries out the video decode operation and stores the decode data in the frame buffer unit A141 before the video reproduction time information VPTS reaches the system time clock STC (step 305). In similar fashion, the audio decoding unit A4 carries out the audio decode operation and stores the decode data in the PCM buffer unit A41 before the audio reproduction time information APTS reaches the system time clock STC (step 306). Incidentally, the video decoding unit A104 and the audio decoding unit A4, which decode each data, do not output the decode data immediately after the decode operation.

Next, the audio decoding unit A4, accessing the system time clock STC, outputs the audio decode data related to the audio reproduction time information APTS from the PCM buffer unit A41 at the time point when the audio reproduction time information APTS matches the system time clock STC or the audio reproduction time information APTS exceeds the system time clock STC (step 307).

Further, the video decoding unit A104, accessing the system time clock STC, outputs the video decode data related to the video reproduction time information VPTS from the frame buffer unit A141 at the time point when the video reproduction time information VPTS matches the system time clock STC or the video reproduction time information VPTS exceeds the system time clock STC (step 308).

Incidentally, the audio-visual reproduction apparatus may output the Dolby digital or the like stream as it is from the optical output terminal. In this case, the stream is temporarily stored in the stream buffer (not shown), and at the time point when the audio reproduction time information APTS matches or exceeds the system time clock STC, the audio decode data related to the audio reproduction time information APTS is outputted.

Now, at the end of inputted data or upon designation of the stop of reproduction by the user (Yes in step 309), the audio-visual reproduction apparatus ends the decode operation. On the other hand, as long as the stop of the reproduction is not designated by the user in the presence of inputted data (No in step 309), the process returns to the video signal storage step (step 301) in which the compression video buffer unit A122 stores the compressed video data and the video reproduction time information management unit A121 stores the video reproduction time information VPTS.

As described above, the audio-visual reproducing apparatus outputs the video decode data and the audio decode data by synchronizing the video reproduction time information VPTS and the audio reproduction time information APTS with the system time clock STC. Especially, the lip-synchronization shift is almost ignorable in the case where the corresponding video decode data and the audio decode data are outputted during the period from the time point when the video reproduction time information VPTS is 50 milliseconds ahead of the audio reproduction time information APTS to the time point when VPTS is 30 milliseconds behind APTS.

Up to this juncture, the method of synchronous reproduction in the case where each of the audio and video signals constitutes a stream of one channel. Next, a method of synchronous reproduction of the stream in the case where the audio and video signals are each two channels is explained.

Figure 5:
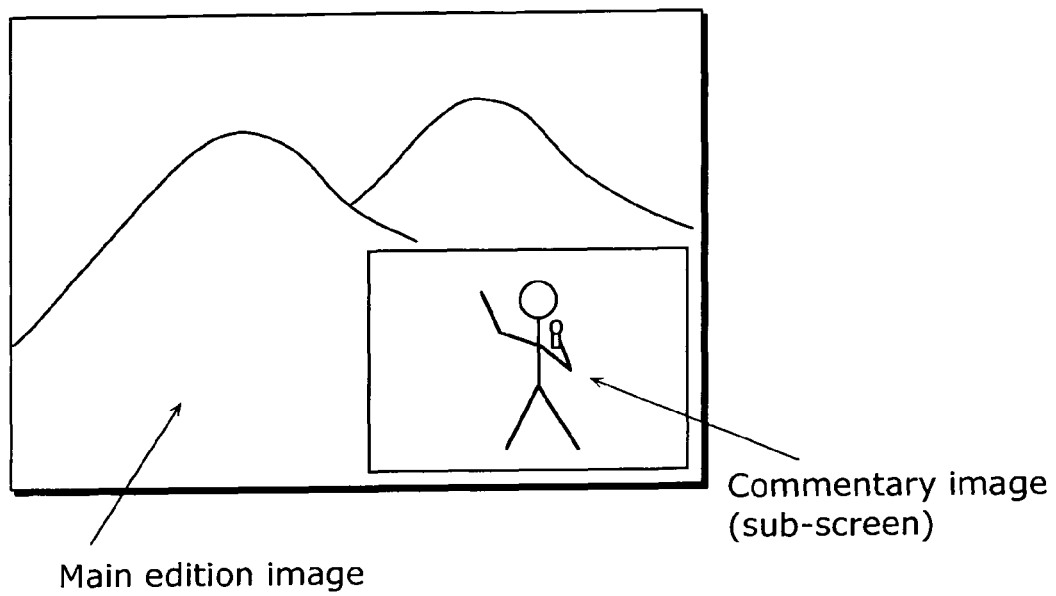
FIG. 5 is a diagram showing an example in which plural images are superposed one on another according to an embodiment.

In this case, as shown in FIG. 5, assume a case in which the commentary image of the contents producer is superposed as a sub-screen on the main edition image constituting the normal reproduced image on the same screen, and the voice corresponding to the commentary image (hereinafter referred to as the "sub-audio") is superposed on the voice corresponding to the main edition image (hereinafter referred to as the "main audio"). Incidentally, the commentary image is for making comments on the main edition image. In the case where a landscape is displayed as a main edition image, for example, the image in which the name of the location, or the like of the landscape are explained by the commentator is a commentary image. Also, the sub-audio is a voice for explaining the main edition image outputted when the commentary image is on display and outputted with the commentary image.

Figure 6:
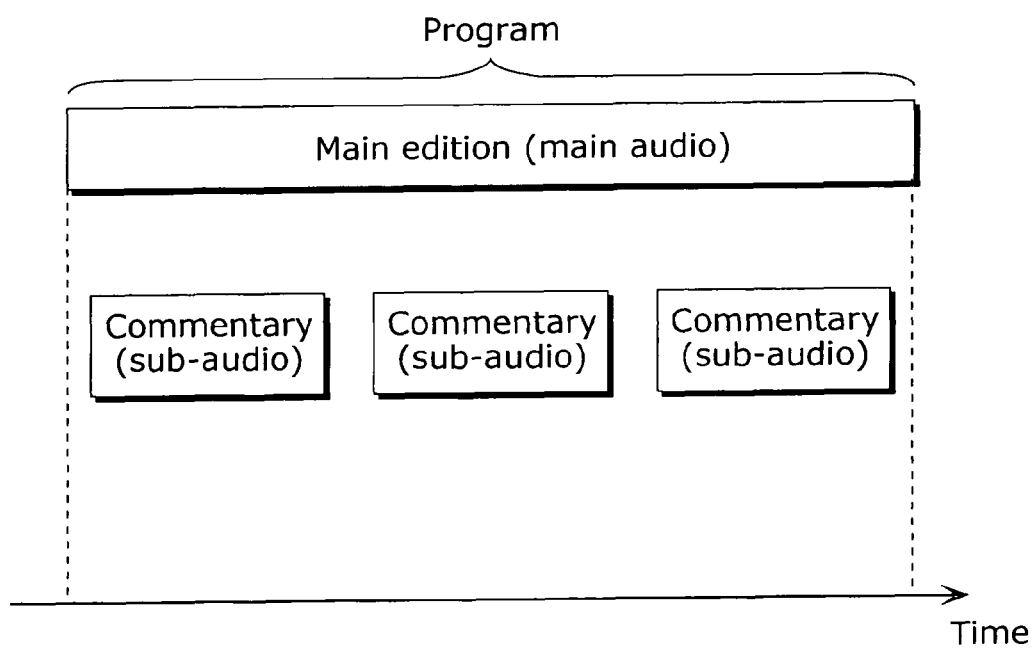
FIG. 6 is a diagram showing an example of the temporal relation of display between the main edition image and the commentary image according to an embodiment.

Next, with reference to FIG. 6, the temporal relation between the main edition image and the commentary image is explained. FIG. 6 is a diagram showing an example of the temporal relation of display between the main edition image and the commentary image. As shown in FIG. 6, for example, the main edition image is displayed from the first to the end of the program, while the commentary image is displayed plural times, during the program, each for a predetermined shorter period of time than the program length. Also, the sub-audio is outputted while the commentary image is on display as described above. Note that there is a case where the time length when the commentary image is displayed may be longer than the time length when the main edition image is displayed. Also, there is a case where the time length during which the sub-audio is outputted may be longer than the time length during which the main audio is outputted.

A method of superposing the commentary image and the sub-audio on the main edition image and the main audio is explained below.

Figure 7:
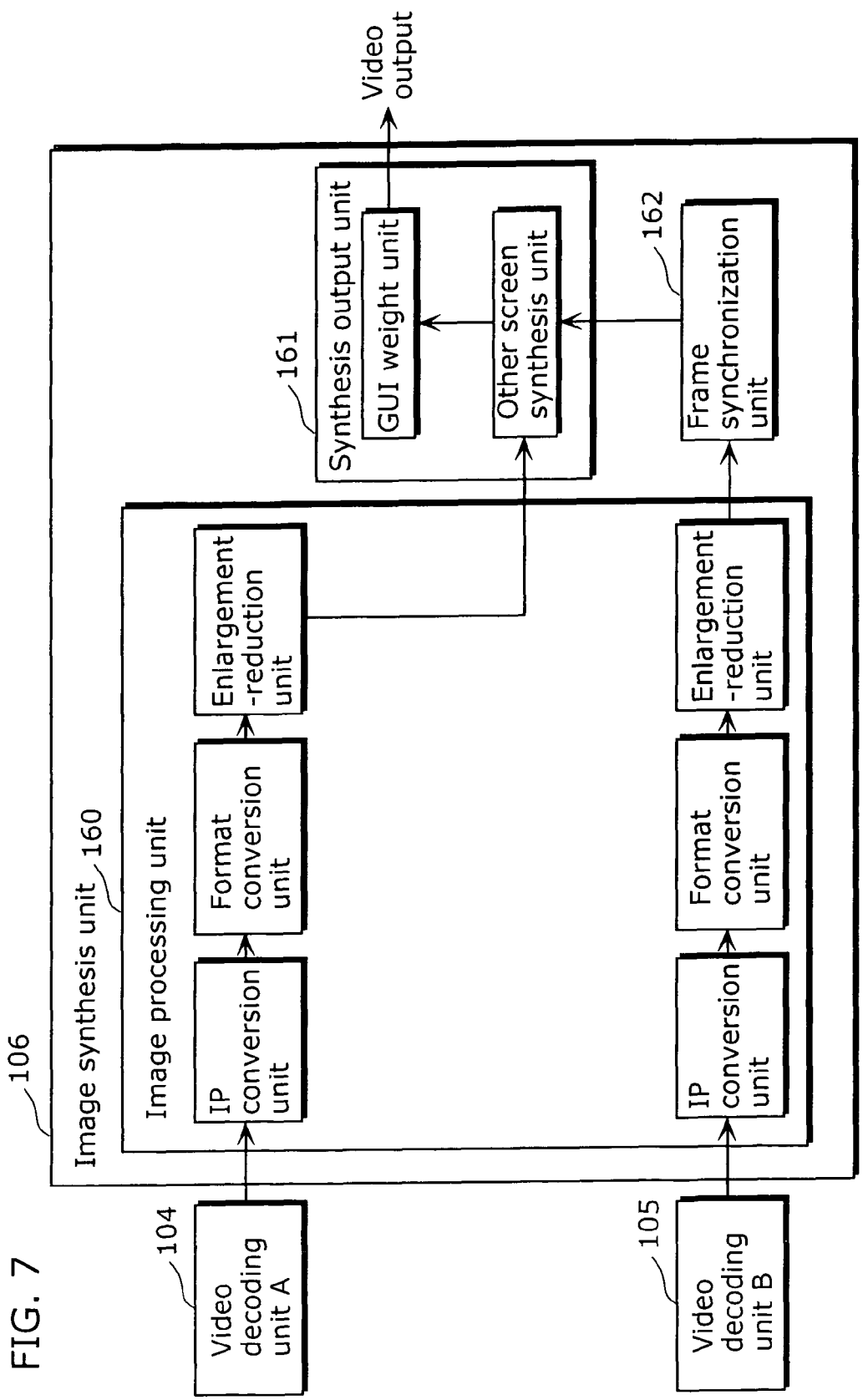
FIG. 7 is a block diagram showing a configuration of the image reproducing apparatus with the commentary image superposed on the main edition image according to the first and fourth embodiments.

First, the method of superposing the commentary image on the main edition image is explained with reference to FIG. 7. FIG. 7 is a block diagram showing a configuration of the video reproducing apparatus for superposing the commentary image on the main edition image.

The video decoding unit A104 decodes the video data of the main edition image, while the video decoding unit B105 decodes the video data of the commentary image. The synchronization between the decode data decoded by the video decoding unit A104 and the video decoding unit B105 is controlled by the video reproduction time information VPTS, or the like in the respective video streams. The decode data obtained by the video decoding unit A104 and the decode data obtained by the video decoding unit B105 are outputted when the respective video reproduction time information VPTS matches the system time clock STC. Then, the respective decode data can be outputted in synchronism with each other.

Depending on the type of the commentary image, however, the synchronization between the main edition image and the commentary image may require an idea. Assume, for example, that one of the main edition image and the commentary image is an image of 24 frames per second obtained from a movie object while the other image contains 30 frames per second. In the case where these images are displayed on the NTSC receiver, the image processing unit 160 changes the format in such a manner that the image obtained from the movie object has 30 frames per second, after which one or both of the two images are enlarged or compressed. After that, the frame synchronization unit 162 synchronizes the frames of the two images. The synthesis output unit 161 outputs two images by superposing one image on the other. As a result, the main edition image and the commentary image are displayed in superposition in synchronism with each other.

As described above, the main edition image is accompanied by the main audio, and the commentary image by the sub-audio. In superposing the commentary image on the main edition image, therefore, the sub-audio is required to be superposed on the main audio. Next, the audio reproducing apparatus for superposing the main audio and the sub-audio one on the other is explained with reference to FIG. 8.

Figure 8:
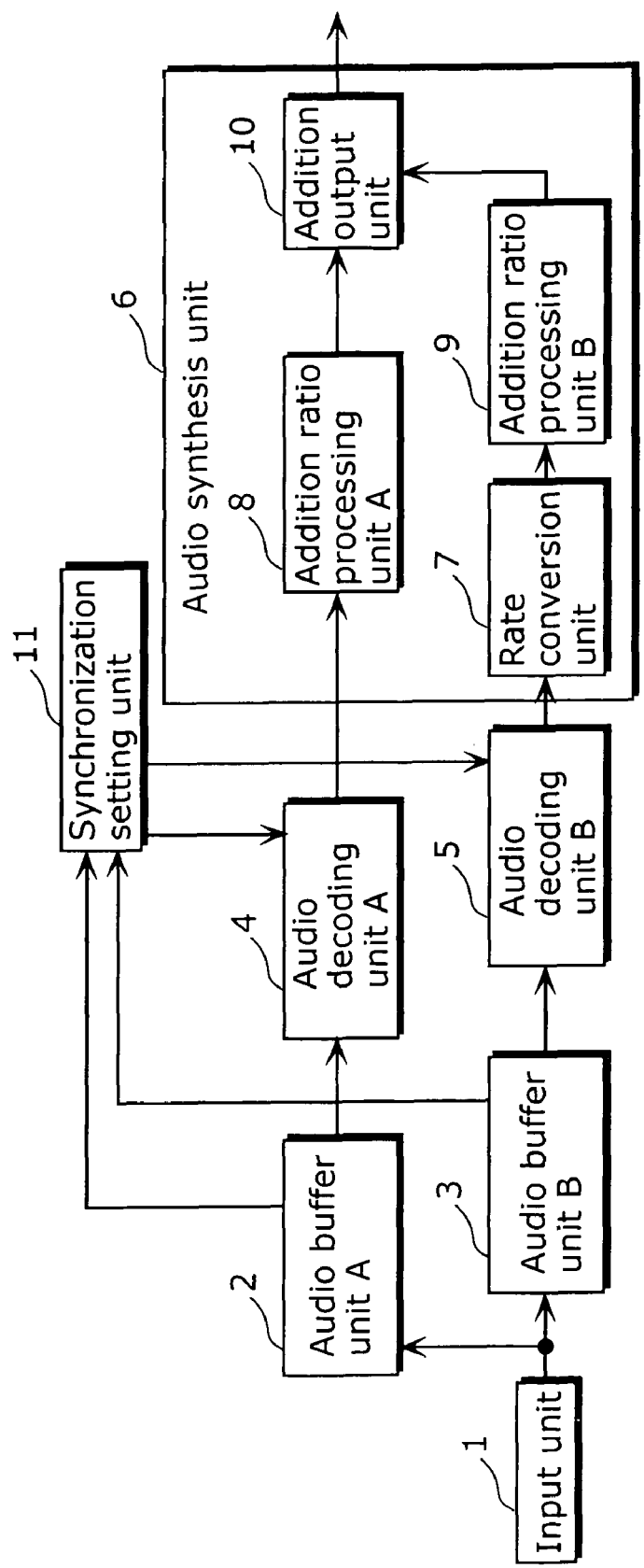
FIG. 8 is a configuration diagram of an audio reproducing apparatus with the main audio and the sub-audio superposed one on the other according each embodiment.

FIG. 8 is a block diagram showing a configuration of the audio reproducing apparatus for superposing the main audio and the sub-audio one on the other.

In the audio reproducing apparatus shown in FIG. 8, the input unit 1 stores the compressed audio data of the main audio and the audio reproduction time information APTS in the audio buffer unit A2, and the compressed audio data of the sub-audio and the audio reproduction time information APTS in the audio buffer unit B3.

Figure 9:
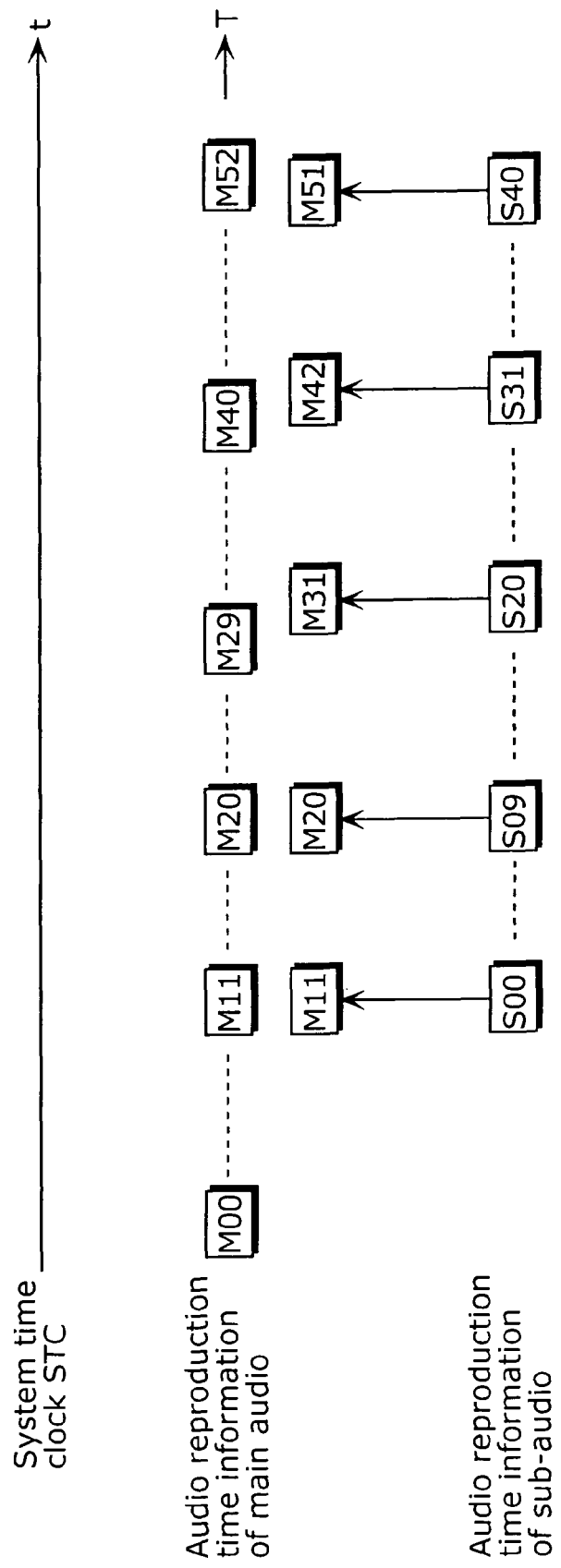
FIG. 9 is a diagram showing the relation between the audio reproduction time information of the main audio and the audio reproduction time information of the sub-audio.

In the synchronization setting unit 11, as shown in FIG. 9, each audio reproduction time information APTS of the sub-audio is allocated on the time axis T specified by each audio reproduction time information APTS of the main audio. The audio reproduction time information APTS of the main audio are blocks designated by "M00" "M11", "M20", "M29", "M40", "M52" and the like. Specifically, in the synchronization setting unit 11, each audio reproduction time information APTS of the sub-audio designated by the blocks "S00", "S09", "S20", "S31" or "S40" is allocated on the time axis T. In the process, the synchronization setting unit 11 allocates each piece of the audio reproduction time information APTS of the sub-audio on the time axis T in a manner which maintains a difference between the values of adjacent pieces of the audio reproduction time information APTS of the sub-audio.

In the example shown in FIG. 9, the difference between the audio reproduction time information APTS M00 at the head of the main audio and the audio reproduction time information APTS S00 at the head of the sub-audio is 11. The synchronization setting unit 11, therefore, allocates each audio reproduction time information APTS of the sub-audio to the value of each audio reproduction time information APTS of the sub-audio plus 11. In the case where the audio reproduction time information S09 of the sub-audio is allocated on the time axis T, for example, the synchronization setting unit 11 allocates the audio reproduction time information S09 to the value 09 plus the difference value 11, i.e. M20. As a result, each audio reproduction time information APTS of the sub-audio is allocated on the time axis T while at the same time maintaining the difference between the values of the adjacent audio reproduction time information APTS of the sub-audio. As a result, as described later, upon reproduction of the main audio and the sub-audio using the audio reproduction time information APTS, the main audio and the sub-audio are reproduced in synchronism with each other.

At the end of operation of the synchronization setting unit 11, the audio decoding unit A4 decodes the compressed audio data of the main audio stored in the audio buffer unit A2 and by accessing the audio reproduction time information APTS, reproduces the voice at the time synchronized with the system time clock STC. On the other hand, the audio decoding unit B5 decodes the compressed audio data of the sub-audio stored in the audio buffer unit B3 and by accessing the audio reproduction time information APTS, reproduces the voice at the time synchronized with the system time clock STC. As a result, the main audio and the sub-audio are reproduced in synchronism with each other.

In the example shown in FIG. 9, the difference between the audio reproduction time information M00 at the head of the main audio and the audio reproduction time information S00 at the head of the sub-audio is 11. This difference is recorded in the header of the stream, for example, and generated by designating the starting time of the commentary image (sub-audio) in advance. The difference may be 0. Specifically, the main audio and the sub-audio may be started at the same time. Also, in the case where the starting time of the sub-audio is set by the operation of the remote controller or the like by the user, the difference is the one between the reproduction time information of the main audio and the reproduction time information of the sub-audio at the starting time point.

Next, consider the following cases. The voice stream including the compressed audio coded data of the main audio and the sub-audio is stored in a single recording medium (such as disk), and the flag information for identifying the main audio and the sub-audio are stored in the header information of the bit stream of each audio stream. Also, three types of voice stream having the main audio flag exist, and one type of the voice stream having the sub-audio flag exists. The main audio is selectively reproduced from the voice in Japanese of Dolby digital 5.1 ch, the voice in English of Dolby digital 5.1 ch and the voice of linear PCM 2 ch. As to the sub-audio, the English voice of Dolby digital 2 ch for the commentary of the author is reproduced. Each voice stream stores the audio reproduction time information APTS. The user selects the main audio and by selecting the menu called the mixed reproduction of the sub-audio, selects the voice at the time of simultaneous reproduction of the main audio and the sub-audio.

A situation can be estimated in which the main audio is English, and the sub-audio is Japanese, French or German, and plural pieces of sub-audio exist. Also, a situation can be estimated in which plural pieces of main audio and plural pieces of sub-audio exist.

In any way, the voice to be reproduced is selected by the user. In the case where the contents of a movie or the like are reproduced, an identifier for identifying the main audio to reproduce the movie scenes and an identifier for identifying the sub-audio making comments on the ideas incorporated in the creation by the movie producer are assigned to the contents in advance, so that the main audio and the sub-audio can be discriminated and reproduced in synchronism with each other. As a result, the user can reproduce the main audio and the sub-audio in synchronism with each other.

Figure 10:
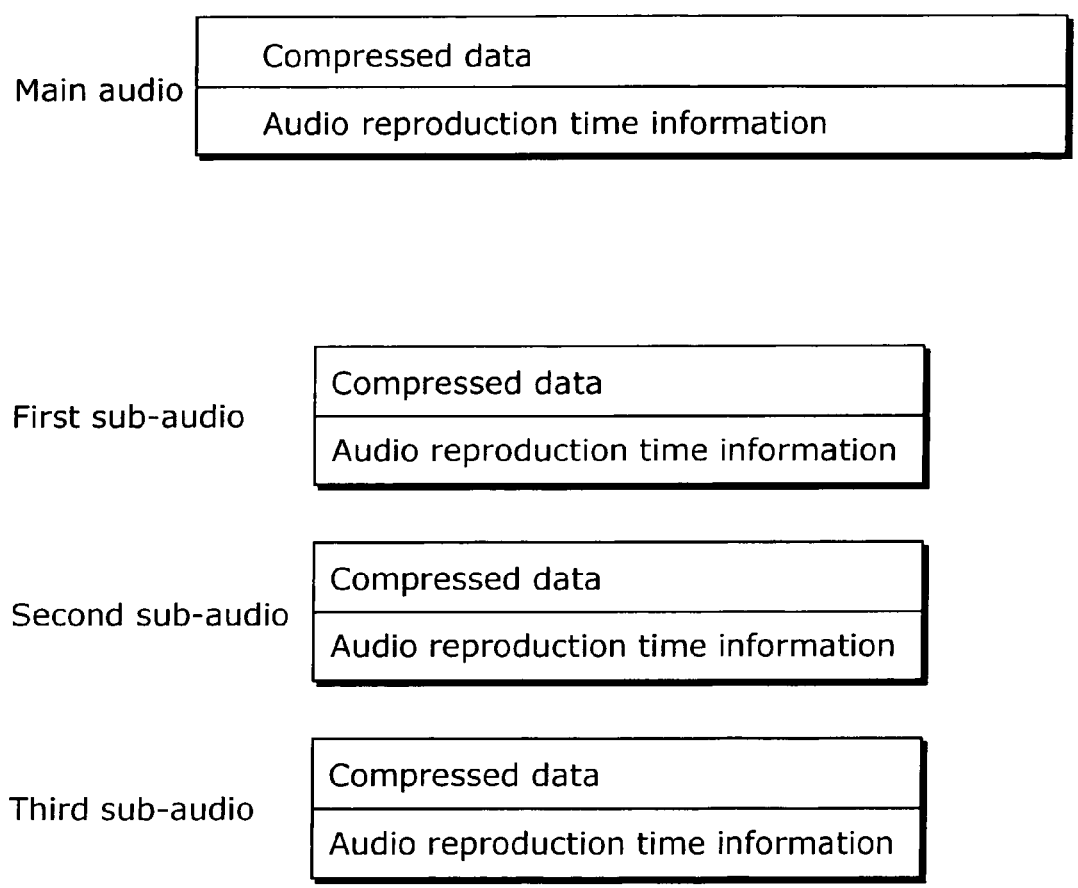
FIG. 10 is a diagram showing the manner in which the audio reproduction time information is added to the voice stream of the main audio and the sub-audio.

FIG. 10 shows the manner in which the audio reproduction time information APTS is added to each voice stream in the case where the main audio is 1 ch and the sub-audio is 3 ch. The sub-audio is a voice stream of, for example, voice in English, voice in Japanese or voice in Korean. As shown in FIG. 10, the audio reproduction time information APTS is stored in each voice stream, and therefore, by the operation of the synchronization setting unit 11 described above, any one of the sub-audio can be reproduced in synchronism with the main audio.

In decoding plural pieces of audio data, the audio frame size of each data may be different due to the difference in the audio coding scheme between main audio and sub-audio. As long as the audio reproduction time information APTS is attached to each audio stream, however, the main audio and the sub-audio can be reproduced in synchronism with each other by using the system time clock STC and each audio reproduction time information APTS. In a configuration in which plural audio decoding units perform the process independently of each other, each audio stream can be reproduced synchronously in accordance with each audio reproduction time information APTS even in the case where the audio frame processing unit is different due to the difference in the coding scheme.

Also, the sampling rate of the main audio and that of the sub-audio may be different from each other. In such a case, the rate conversion unit 7 changes the sampling rate of one reproduction audio signal in accordance with the sampling rate of the other reproduction audio signal. As a result, the main audio and the sub-audio can be reproduced in accordance with the sampling rate. In the case where the contents include the recording as to whether the main audio or the sub-audio such as a commentary is involved, the rate conversion unit 7 sets the sampling rate of the sub-audio to that of the main audio. Regardless of whether the commentary voice exists or not, therefore, the main audio and the sub-audio are reproduced at a constant sampling rate, and therefore the user can hear the main audio and the sub-audio without sense of incongruity.

A method of changing the sampling rate is available in which the digital voice is returned to an analog voice provisionally by use of a DA converter for converting the digital voice into the analog voice and the AD converter for operating the other way around. A method is also available, for example, in which the sampling rate is changed to the desired rate using a semiconductor circuit called the sampling rate converter, or in which a voice of a rate changed voice is generated by thinning or interpolation easily employed in the case where the sampling rates are multiples of each other.

Next, a method of selecting an audio signal having a main sampling rate employed in the case where the identifiers of the main audio and the sub-audio are not recorded, for example, is explained. As a method of selecting an audio signal having the main sampling rate, an audio signal having a longer continuous voice reproduction section is selected, and the sampling rate of the audio signal shorter in the continuous voice reproduction section may be changed by being matched to the sampling rate with a longer voice reproduction section. In the case where a sub-audio such as comments on a specific scene is inserted as a commentary for the purpose of aiding the main audio as shown in FIG. 6, the sub-audio has a shorter voice reproduction section than the main audio. In such a case, the voice longer in reproduction section is selected as an audio signal having a main sampling rate, and the sampling rate of a voice shorter in reproduction section is changed to the sampling rate of the selected audio signal. Also, the reproduction of the sub-audio, as shown in FIG. 6, may start and end midway of a story such as when only a specified scene is reproduced. In the case where the voice longer in voice reproduction section is selected as a voice having a main sampling rate, therefore, the time of reproduction of the voice having the same sampling rate is lengthened, thereby conveniently shortening the time during which the user has a sense of incongruity.

In another selection method, one audio signal having no intermittent voice reproduction section is selected, and the sampling rate of the audio signal having an intermittent voice reproduction section is set to the sampling rate of the audio signal having no intermittent voice reproduction section. The sampling rate of an audio signal having an intermittent voice reproduction section such as in reproducing an audio signal having an intermittent commentary reproduction section for each scene is changed to the sampling rate of a voice having no such intermittent reproduction section.

In still another selection method, one audio signal having a higher sampling rate than the other is selected, and the sampling rate of a voice having a lower sampling rate may be changed to the higher sampling rate. Specifically, the audio signal of a high audio quality is left as it is, while by such as up-sampling the other audio signal, the rate is changed and synthesis carried out. In this case, if the sampling rates of the two audio signals are in such a ratio that one is a multiple of the other, the circuit for voice synthesis after rate change can be simplified. In the case where the sampling rate of one audio signal is 96 KHz and the sampling rate of the other audio signal is 48 KHz or the sampling rate of one audio signal is 48 KHz and the sampling rate of the other audio signal is 24 KHz, for example, the audio signal data interpolated in frequency can be added as it is and therefore synthesis is facilitated.

On the contrary, when one audio signal is selected, an audio signal having a lower sampling rate is selected, and the sampling rate of an audio signal having a higher sampling rate may be changed to the lower sampling rate. This method is used in the case, for example, where the transmission band for audio output is limited or the reproduced voice of high voice quality is not required. For example, assuming a case such that the audio data is transmitted using a specified transmission path, by changing to the lower sampling rate, the transmission amount of the voice data can be advantageously reduced. Also in this case, if the ratio of sampling rate between the two audio signals is such that one is a multiple of the other, the circuit for voice synthesis after rate change can be simplified. In the case where the sampling rate of one audio signal is 96 KHz and the sampling rate of the other audio signal is 48 KHz or the sampling rate of one audio signal is 48 KHz and the sampling rate of the other audio signal is 24 KHz, for example, the audio signal data thinned in frequency can be added as it is and therefore synthesis is facilitated.

Also, when one audio signal is selected, an audio signal having a continuous voice reproduction section not changed in sampling rate midway is selected, and the sampling rate of an audio signal with the sampling rate thereof changed midway is changed to the sampling rate of the audio signal not changed midway. This method is used in the case where plural commentaries are involved or the sampling rate of even the main audio is changed sometimes. In decoding the compressed audio data, the voice mute operation may be required at the change point of the sampling rate. Therefore, the audio signal with the rate not changed is selected as far as possible to reduce the section for which the voice is muted and easily realize the continuous voice reproduction.

In a configuration of the audio decoding unit in which the coding scheme of the reproduction contents or the sampling rate is changed midway, the coding program to be decoded or the setting of the arithmetic circuit hardware may be required to be changed. In such a case, at the time of the audio decoding unit initialization, the compressed audio data stored in the corresponding compression audio buffer unit and the information such as the read pointer and the write pointer are required to be cleared. Not only the information in the compression audio buffer unit but such information as the audio reproduction time information APTS of the audio reproduction time information management unit and the information of the storage address pointer are also required to be erased. Only the audio buffer information of which the coding scheme or the sampling rate is changed may be cleared. As to the coding scheme or the sampling rate which has not been changed, the user can enjoy the music reproduction without being conscious of the switching by continuing to decode and reproduce the compressed audio data.

In order to add the audio data changed in sampling rate by the rate conversion unit 7, the addition ratio processing unit A8 and the addition ratio processing unit B9 change the reproduction output level. For example, the addition ratio information indicating the addition ratio of the sub-audio such as the commentary to the main audio is stored in the header information of each audio stream or the stream of the sub-audio such as the commentary in the recording medium, or the like. The addition ratio processing unit A8 and the addition ratio processing unit B9, in the case where the sub-audio such as the commentary is synthesized with the main audio, synthesizes the main audio and the sub-audio with each other by multiplying one or both of the main audio and the sub-audio by the addition ratio in the value corresponding to the addition ratio information. For example, the addition ratio processing unit A8 and the addition ratio processing unit B9 add both the main audio and the sub-audio by reducing the output level to such as 0.7 times as large as the original voice.

Normally, the voice obtained by multiplying each voice by the addition ratio in accordance with the addition ratio information is reproduced. Nevertheless, emphasis of the sub-audio such as the commentary may be desired.

As a first method, consider a case in which an arbitrary one of separately decoded voices is synthesized with the other one. The reproduction output level of the arbitrary one of the voices is reduced only for the part synthesized with the other voice, and the two voices are synthesized, while for the part not synthesized with the other voice, the reproduction output level of the arbitrary one voice is not reduced. In the case where two voices are synthesized with the reproduction output level at a constant value of 1, for example, the reproduction output level of the audio added-to is reduced from the constant value 1 to 0.6, while the reproduction output level of the add-audio is reduced to 0.4 thereby to maintain the whole reproduction output level at the constant value 1. In this case, the voice added to can be emphatically heard. In such a case where the voice to be synthesized is a commentary voice, for example, the reproduction voice level of the commentary voice is increased while the reproduction voice level of the main audio is reduced when it is desired to listen carefully to the commentary.

As a second method, consider a case in which the user desires to arbitrarily set the reproduction voice level by increasing or decreasing it as compared with a defined value. In the case where an arbitrary original voice is synthesized with a part of the other voice, assume that the other voice is set to a still higher level as intended by the user. In this case, the output level of the arbitrary one original voice is reduced in accordance with the increase of the other original voice. This is by reason of the fact that in the case where one is added at the same volume while the other is increased, a part of the voice after addition develops a signal component exceeding the reproduction dynamic range, and a voice distortion such as clipping occurs, thereby probably leading to a voice very difficult to pick up. On the other hand, in the case where the output level of the sub-audio is reduced, the addition ratio of the main audio can be relatively increased.

Figure 11:
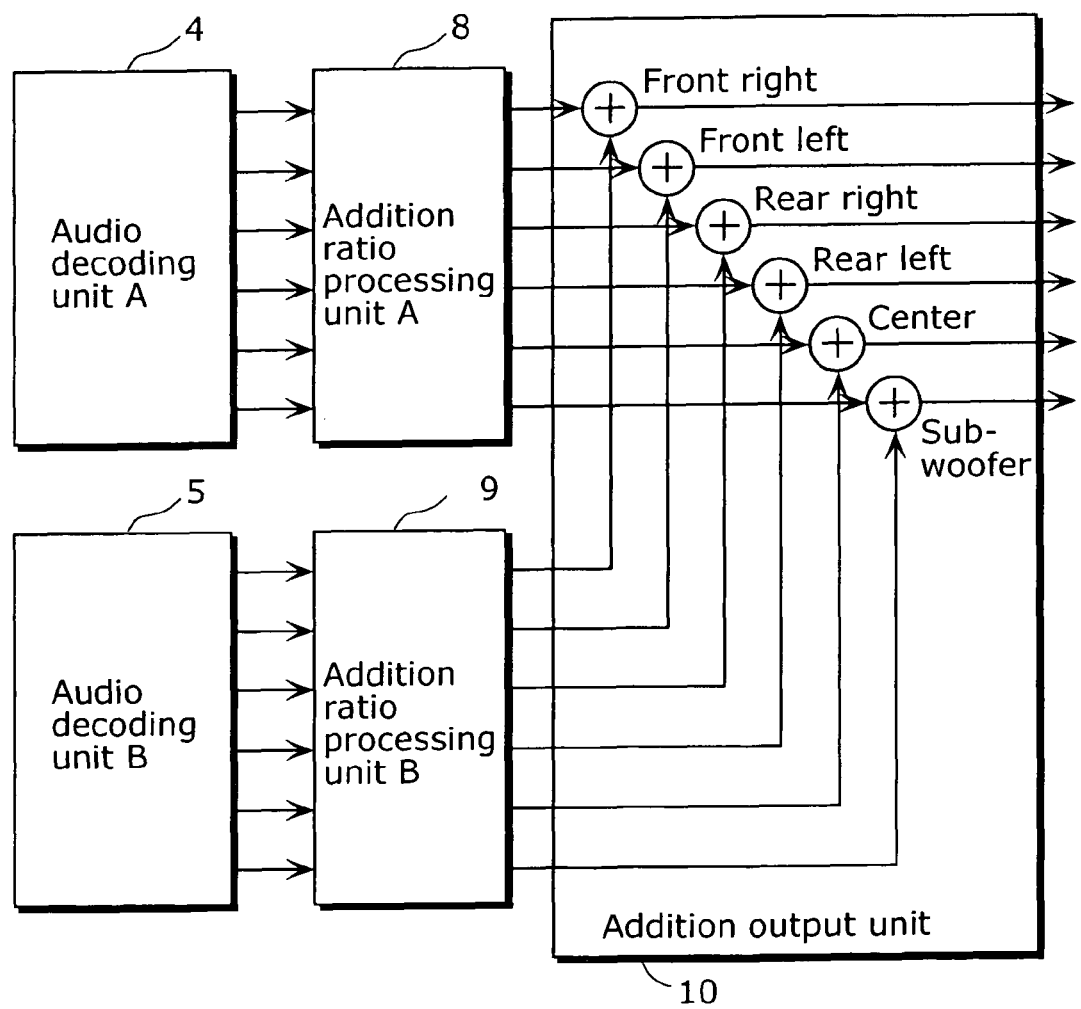
FIG. 11 is a diagram showing an example of the configuration of an addition output unit for explaining the audio addition method according to the first embodiment.

Once the rate conversion unit 7 changes the sampling rate and the addition ratio processing unit A8 and the addition ratio processing unit B9 processes the addition ratio, the addition output unit 10 synthesizes the voice. In this case, the number of reproduction channels may be varied from one voice to another. FIG. 11 shows an example of configuration of the addition output unit 10 (the rate conversion unit 7 is not shown to simplify the drawing). In accordance with the number of the reproduction signal channels of the arbitrary one voice, the addition ratio process is executed, after which the addition output unit 10 synthesizes by unifying or distributing the number of channels of the reproduction signal of the other voice.

For example, the addition channel information of the sub-audio such as commentary for the main channel is stored in the header information of each audio stream or the stream of the commentary and recorded in a recording medium and such. The addition output unit 10, in synthesizing the sub-audio such as the commentary with the main audio, synthesizes the voices in a value corresponding to the addition channel information. For example, the addition output unit 10 synthesizes the sub-audio on the center channel of the main audio.

The addition channel information can be assumed to include the addition channel information such as the mixing level or the channel mapping of each addition channel and the addition limit information to a specified channel, the sampling rate, the number of the sampling bits of each channel and the data rate of the compressed stream. Further, in the presence of the detailed addition ratio information such as the addition volume coefficient table together with the addition channel information, the sub-audio is added to the front right channel of the main audio by reducing the output level to 0.7 fold and to the front left channel by reducing the output level to 0.7 fold, for example.

Further, in the case where the addition channel information has such information as to permit selection from plural patterns, assume that the voice reproduced by the audio decoding unit A4 is 5.1 ch and the voice reproduced by the audio decoding unit B5 is monaural 1 ch. As the object to which the voice reproduced by the audio decoding unit B5 is to be added, an interface is provided indicating to the user choices including (first) the center channel alone, (second) two channels, i.e. front right and front left channels, (third) the center channel and the subwoofer channel, and (fourth) the front left and right channels and the subwoofer channel, so that the object added to is selected by the user. In this way, the synthesis of the designated channels can be realized after changing the output gain of each channel at the channel addition ratio meeting the desire of the user. In the case where the main audio and the sub-audio have the same number of channels and no channel to be added to is designated by the user, each channel can of course be added. Also, in the case where the user desires to increase the volume of the sub-audio associated with the channel to be added or otherwise, for example, the mixing level is required to be adjusted to prevent the clipping of the main audio. In this case, not only the gain of the main audio of the added channel is changed downward, for example, but also the addition ratio of the other channels is changed as required taking the balance with the other main audio channels into consideration. The addition ratio can be set desirably in versatile way as desired by the user to reduce the volume of the main audio with the increase in the volume of the sub-audio or to increase the volume of the main audio with the decrease in the volume of the sub-audio.

Patent Publication 1 for the prior art contains some description of the simultaneous reproduction with different reproduction channels. The description refers to the fact that the first voice is outputted as monaural to the front right and the second voice as monaural to the front left channel by channel or that one of the first and second voices is outputted in stereo 2 ch. Also, the description is made that in the case of 5.1 ch, the first voice is outputted as stereo 2 ch and the second voice as stereo 2 ch or one of the first and second voices is outputted as 5.1 ch. These description, however, refer to a case in which the first and second voices are not outputted by synthesis but separately out of different speakers at the same time. No detailed explanation is made about a method of outputting by synthesizing plural voices from the same speaker. Nor the detailed description is made about the method of synchronizing plural voices.

Also, according to the present invention, in the case where the number of channels of the sub-audio such as the commentary is greater than that of the main audio, the choices as to which channel of the main audio is unified with the plural the channels, for example, are presented to the user, and the selection is received from the user. Based on this selection, the addition ratio is set by which the adder executes the addition of the voices without clipping. For setting the addition ratio, for example, first, the clipping channel is set to a value free of clipping, after which the addition ratio of the other channels is set again in accordance with the output level relative to the channel with the addition ratio set. A configuration allowing the user to set the addition ratio for each channel can of course be formed. Thus, each addition ratio processing unit makes the addition in accordance with the number of reproduction channels.

Assume that the addition value is changed in response to an instruction of the user. By suspending the reproduction provisionally, muting the voice and changing the addition coefficient, for example, the addition value can be changed without causing any noise and such in the process. In the case where a detector is provided for detecting the clipping before the decode voice is multiplied by the addition ratio and the synthesized result is outputted, the addition ratio processing unit A8 and the addition ratio processing unit B9 automatically change the addition value, whereby the addition ratio is changed again and the synthesis is made again not to cause the clipping, thereby making it possible to prevent the noise. Also, a processing unit is provided for changing the addition coefficient in such a manner that the audio output level is gradually decreased to a level free of clipping with the detection of the clipping time point by the detector. As a result, an apparatus can be realized in which noises are not outputted continuously.

Figure 12:
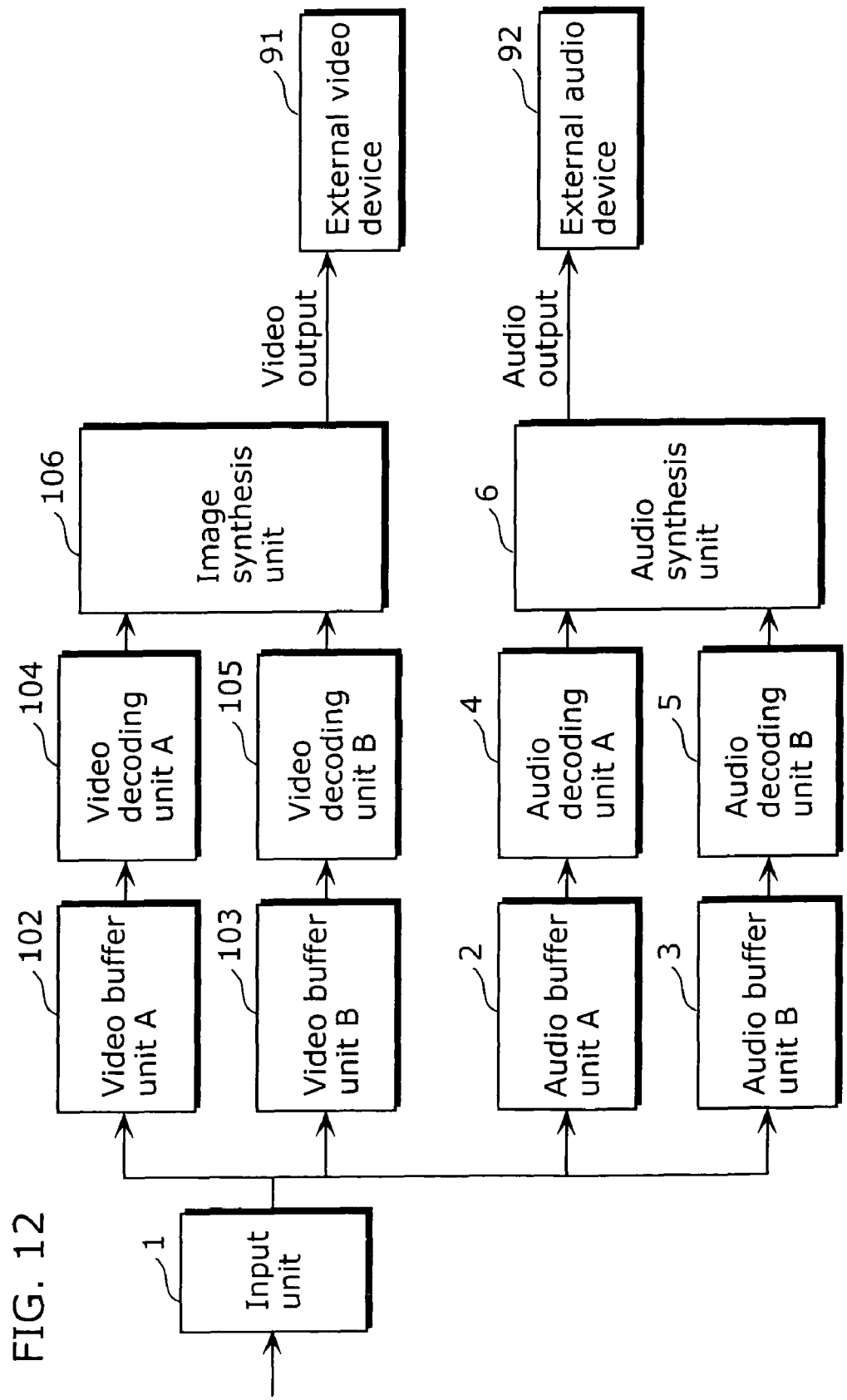
FIG. 12 is a diagram for explaining the connection between the audio reproducing apparatus and the external connection devices according to the first embodiment.

Further, the voice synthesis may be affected by the configuration of an external connected device connected to the audio reproducing apparatus. Assume, for example, that an external audio unit 92 shown in FIG. 12 is connected to the audio reproducing apparatus. Depending on the configuration of the external audio unit 92, the connected speaker may have only three channels even in the case where the original reproduction contents have 5.1 ch. In such a case, the number of the channels of an arbitrary audio signal is unified or distributed while at the same time unifying or distributing the number of channels of the other audio signal for synthesis in accordance with the number of channels of the external audio unit 92.

Also, the number of channels for reproduction output may be changed by the user. In such a case, the number of the reproduction signal channels of the arbitrary voice is unified or distributed while at the same time unifying or distributing the number of channels of the reproduction signal of the other voice for synthesis in accordance with the voice output channel designated by the user from the setting of the external audio unit 92 or the output unit in the voice reproducing apparatus. With this configuration, the addition value required for the addition ratio processing can be automatically set by the audio reproducing apparatus by the user setting the whole or a part of the audio output.

Figure 13:
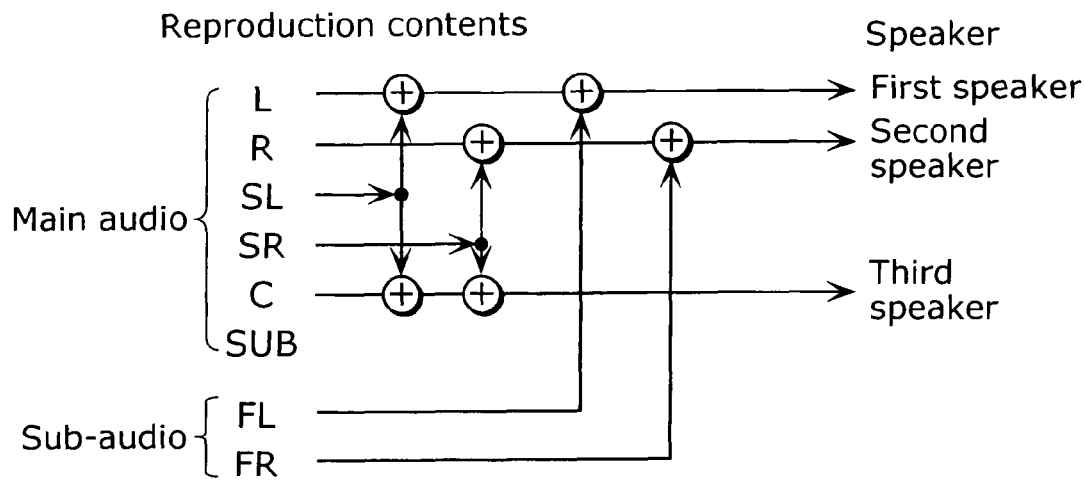
FIG. 13 is a diagram for explaining the voice unification.

An example of voice unification in the case where the reproduction contents of the main audio is 5.1 ch, the reproduction contents of the sub-audio is 2 ch and the connecting speaker has only 3 channels is explained with reference to FIG. 13. In this example of unification, as shown in FIG. 13, the SL channel of the main audio and the FL channel of the sub-audio are added to the L channel of the main audio, and then the sum is outputted from the first speaker. Also, the SR channel of the main audio and the FR channel of the sub-audio are added to the R channel of the main audio, and the sum is outputted from the second speaker. Further, the SL channel of the main audio and the SR channel of the main audio are added to the C channel of the main audio, and the resulting sum is outputted from the third speaker. As an alternative, the L channel of the main audio is outputted from the first speaker. Also, the R channel of the main audio is outputted from the second speaker. Further, the FL channel of the sub-audio and the FR channel of the sub-audio are added to the C channel of the main audio, and the sum is outputted from the third speaker.

Also, the channel to which the sub-audio is added may be changed with time. For example, one or both of the channels for the sub-audio can be first added only to the L channel of the main audio, then to the L channel of the main audio and the C channel of the main audio, then only to the C channel of the main audio, then to the C channel of the main audio and the R channel of the main audio, and lastly only to the R channel of the main audio. In this way, the channel added to can be changed with time. By doing so, the added voice is heard as if moving spatially from left to right of the viewer.

Figure 14:
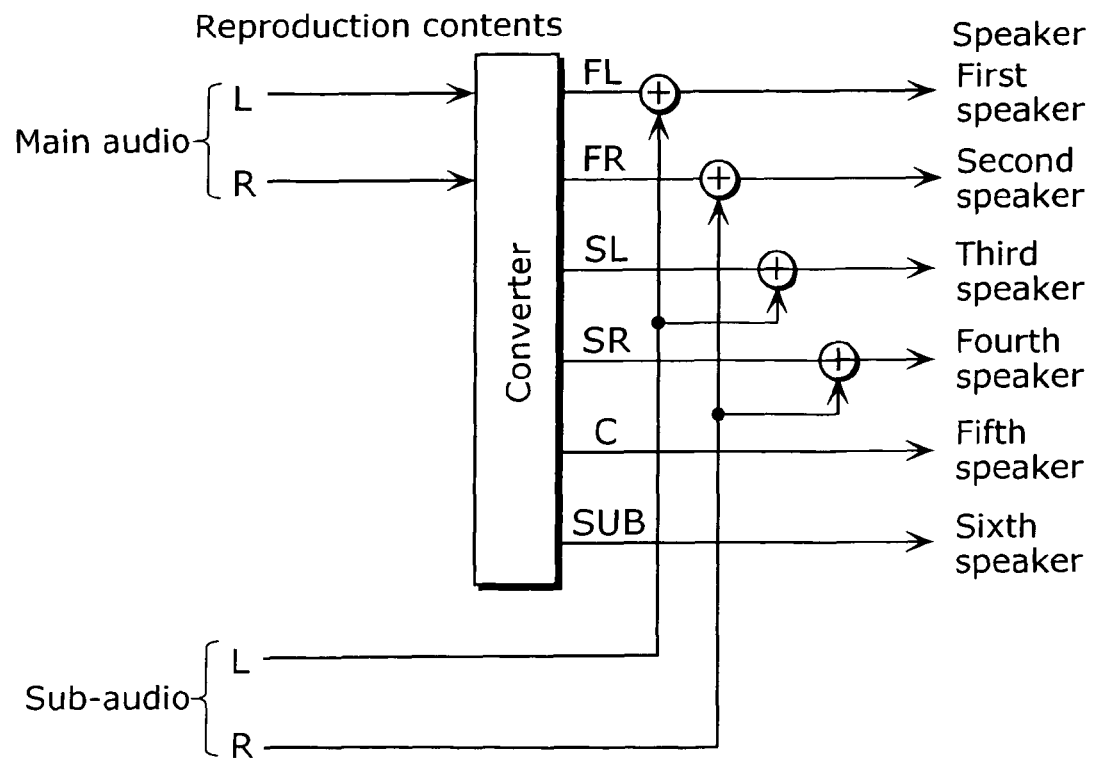
FIG. 14 is a diagram for explaining the voice distribution.

Next, an example of the voice distribution in the case where the reproduction contents of the main audio and the sub-audio are each 2 ch and the connecting speaker is 6 ch is explained with reference to FIG. 14. In this example of distribution, as shown in FIG. 14, the L channel and the R channel of the main audio are converted by the converter to 6 channels, after which (1) the L channel of the sub-audio is added to the FL channel of the main audio after conversion, and the resultant sum is outputted from the first speaker, (2) the R channel of the sub-audio is added to the FR channel of the main audio after conversion, and the resultant sum is outputted from the second speaker, (3) the L channel of the sub-audio is added to the SL channel of the main audio after conversion and the resultant sum is outputted from the third speaker, (4) the R channel of the sub-audio is added to the SR channel of the main audio after conversion and the resultant sum is outputted from the fourth speaker, (5) the C channel of the main audio after conversion is outputted from the fifth speaker, and (6) the SUB channel of the main audio after conversion is added and the resultant sum is outputted from the sixth speaker.

Further, as shown in FIG. 12, the convenience is further improved by a configuration in which the external video device 91 and the external audio device 92 are connected to the audio reproducing apparatus, which recognizes the information for specifying the mating equipment such as the device ID of the external connected devices, thereby acquiring the information on the number of speakers capable of output and the information of setting the channels for synthesis of the main audio and the sub-audio, while at the same time setting the selection of the addition before or after each output process at the time of variable speed reproduction.

For example, assume a configuration in which the audio reproducing apparatus receives the ID number or the like to identify the type of the mating output device, and sets the various setting conditions by accessing the table in the body or in the condition-setting memory card. Then, the main audio and the sub-audio can be synthesized in accordance with the number of channels capable of output without the user operation of the audio reproducing apparatus.

Figure 15:
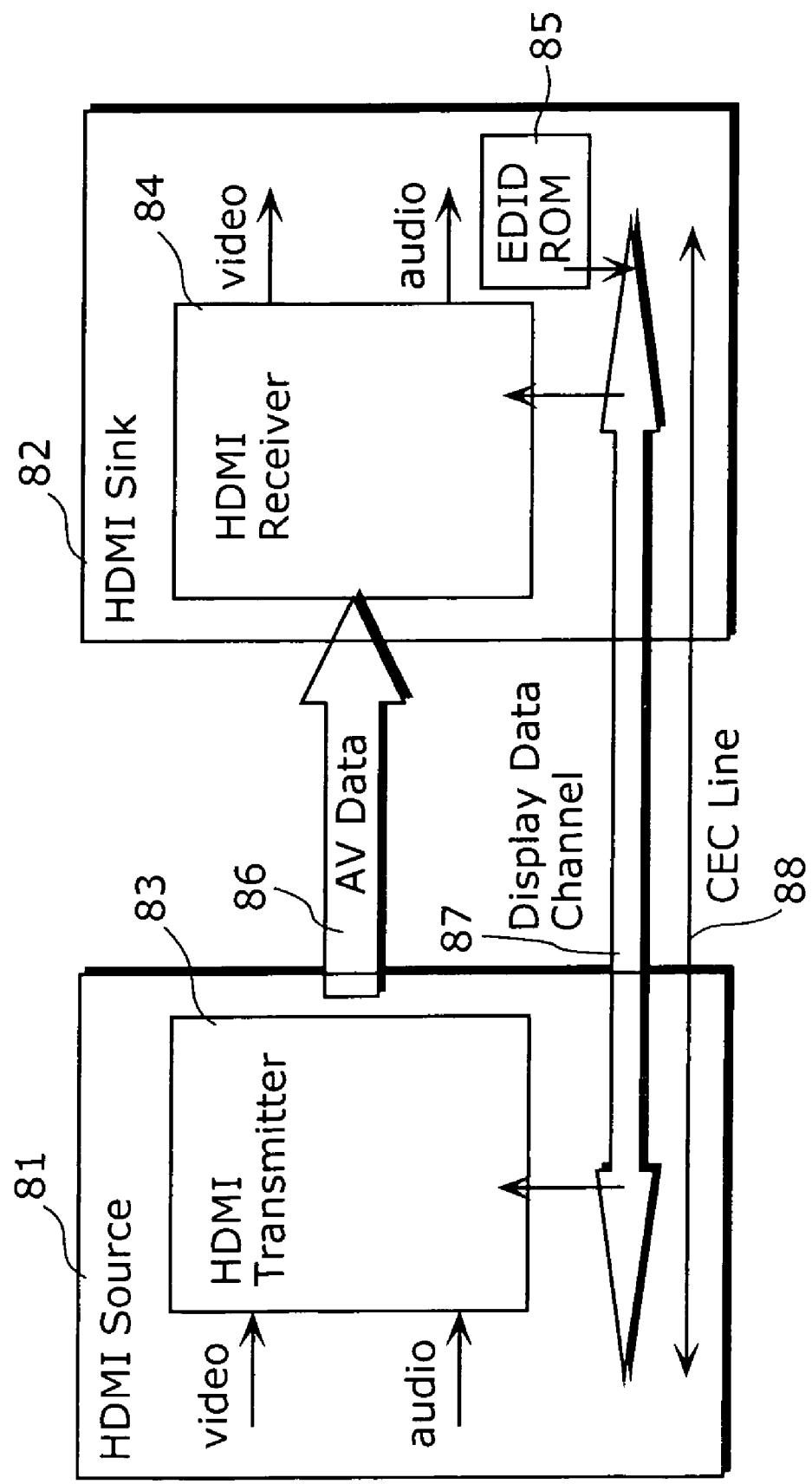
FIG. 15 is a diagram for explaining the connection between the audio reproducing apparatus and the external connection devices according to the first embodiment.

In order to acquire the information on the mating devices, the devices are connected with a specification, for example, called the high-definition multimedia interface (HDMI). FIG. 15 shows a configuration of two devices connected by HDMI. FIG. 15 illustrates a source-side device 81, a synchronization-side device 82, a transmitter 83 for sending the AV data 86, a receiver 84 for receiving the AV data, a command line 88 for sending a command for power on or channel control, a line 87 for exchanging unique device information, and a ROM 85 for storing the unique device information. According to HDMI, by following the procedure of authentication that the source-side device 81 and the synchronization-side device 82 can be connected to each other, the source-side device 81 sends the AV data in appropriate AV data format to the synchronization-side device 82. At the same time, the unique device information data are sent. The audio reproducing apparatus making up the source-side device 81, upon acquisition of the unique device information of the external video device 91 and the external audio device 92 by this method, can acquire such as the limit of the number of channels synthesized and the information on the limit of the format of the synthesized image and can change the setting. The information thus acquired, as far as held as a default setting by the audio reproducing apparatus, makes it possible to enjoy AV in always the same state as long as the device connection remains unchanged. On the other hand, in the case where the connected device ID, or the like is changed, the setting can be changed by receiving the information on the mating device each time.

The synthesized output of such as the main audio and the sub-audio can be produced by synthesizing and outputting the PCM data contained in each PCM buffer. This PCM data is outputted from the audio DAC built in the audio reproducing apparatus or the optical digital cable corresponding to the digital audio interface standard such as IEC60958. In this way, the PCM data can be transmitted to and reproduced by the external audio device 92. Further, the PCM data prepared by synthesizing the main audio and the sub-audio is audio coded and thereby converted into the digital coded data of the Dolby digital system or the like. This data may be outputted to the externally connected devices according to the audio digital interface standard such as IEC61937 of the compression coded stream through the optical digital cable, the HDMI cable or the like.

These externally connected devices are considered to include the monitor output device such as TV, the audio output amplifier, the interface device such as the AV amplifier having the AV selector function, the portable output device, the on-vehicle AV reproduction device, and the like.

The addition output unit 10 outputs the audio data subjected to the addition ratio process in each addition ratio processing unit, at the same sampling rate without any voice clipping. Further, the addition output unit 10 executes the voice mute process or the like in the case, for example, where the sampling rate is changed or the addition ratio is changed while the voice continuity cannot be maintained.

The audio synthesis unit 6, as shown in FIG. 8, is configured of a rate conversion unit 7, an addition ratio processing unit A8, an addition ratio processing unit B9 and an addition output unit 10. The rate conversion unit 7 located on the audio decoding unit B5 side is explained above. The rate conversion unit 7, however, may alternatively be located on the audio decoding unit A4 side or the audio decoding unit A4 side and the audio decoding unit B5 side. Also, in spite of the foregoing description of a case in which two voices are synthesized, a configuration is also possible in which each decoding unit decodes three or more compressed audio data for synthesis.

Also, with a configuration in which the system time clock constituting the reference for the system as a whole is made variable and the reference value of the system time clock signal can be variably updated, the mutual synchronism can be secured by collectively decoding the audio reproduction time information of plural audio signals reproduced synchronously based on the reference information.

The coded data stream of the compressed audio data for the sub-audio may be inputted from the devices connected by a network as well as from a single recording medium. Also, it may be supplied from a recording medium separate from the recording medium having recorded therein the main audio. Both may be reproduced by being downloaded from the external device connected through a network. Also, it may be recorded in advance or in an initialized state in a recording unit such as a hard disk or a semiconductor unique to the device. In any way, the synchronous reproduction is possible as long as the mutual voice reproduction time information are related to each other to secure the synchronous reproduction of the main audio and the sub-audio. Unless so related, the reproduction of the reproduction time information is not required in spite of simultaneous reproduction.

Also, the inputted stream is not limited to the stream recorded in the recording medium such as DVD or the stream recorded by receiving the digital broadcast signal. It may alternatively be an encoded stream of a digitally coded analog signal from an external source. By attaching the audio reproduction time information APTS or the video reproduction time information VPTS at the time of encoding, the AV synchronization can be made possible at the time of reproduction. Also, a system for realizing the after-recording reproduction can be realized by a configuration in which a separate audio stream originally existent and synchronized with the reproduction voice is encoded, and the audio reproduction time information is attached by reference to the audio reproduction time information of the original audio stream.

Figure 16:
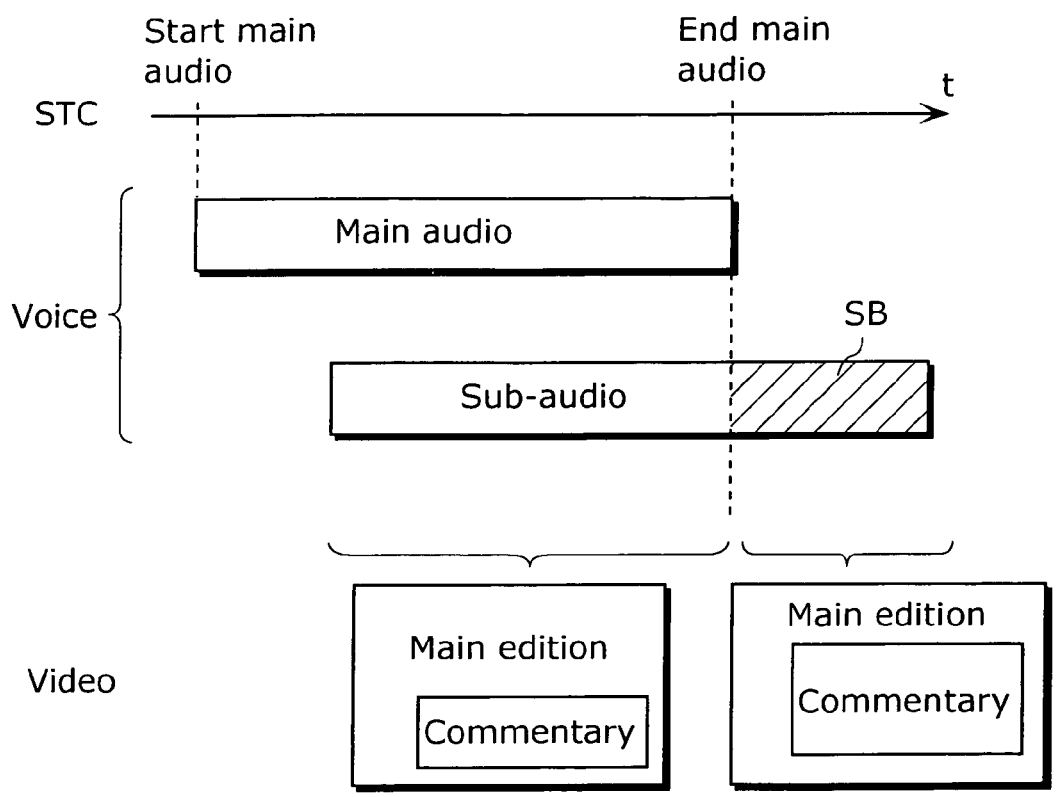
FIG. 16 is a diagram showing the manner in which the sub-audio is not yet ended after the end of the main audio.

Also, in FIG. 6, the commentary image is displayed plural times for a predetermined period shorter than the length of the main edition image. The commentary image, however, as shown in FIG. 16, may be started midway of the main edition image and yet to be finished after the end of the main edition image. As a result, the sub-audio is not finished with the end of the main audio (see SB portion in FIG. 16). In such a case, the sub-audio is reproduced in synchronism with the main audio in accordance with the audio reproduction time information APTS of the main audio until the main edition image is finished. At the end of the main audio, (1) the sub-audio may be reproduced in accordance with the system time clock STC, (2) the audio reproduction time information APTS of the main audio after the end thereof is predicted and the sub-audio may be reproduced in accordance with the predicted audio reproduction time information APTS of the main audio, or (3) the sub-audio may be reproduced in accordance with the audio reproduction time information APTS of the sub-audio. Also, at the end of the main edition image, the commentary image may be displayed in enlarged form.

Figure 17:
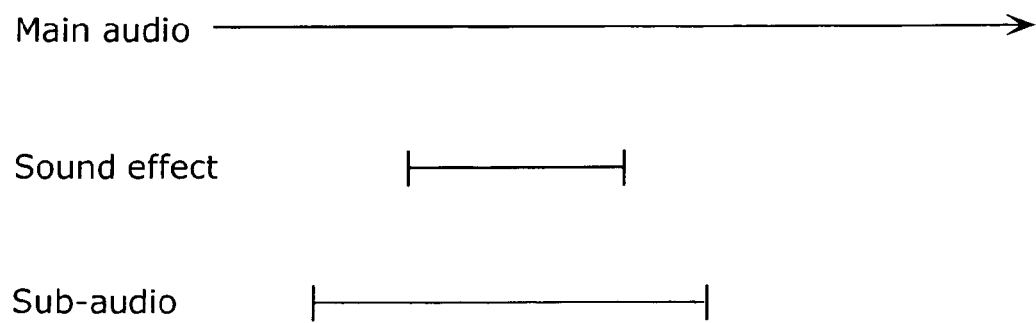
FIG. 17 is a diagram showing the manner in which the effect sound is synthesized with the main audio.

Also, as shown in FIG. 17, the sound effect (such as a buzzer sound) may be synthesized in the main audio. In the case where the sound effect signal contains the audio reproduction time information APTS, the sound effect is processed as a sub-audio, and by using this audio reproduction time information APTS, the sound effect may be reproduced in synchronism with the main audio and the sub-audio. On the other hand, in the case where the sound effect signal contains no audio reproduction time information APTS, the synchronous reproduction is possible similarly by defining the reproduction time information APTS of the main audio corresponding to the reproduction start time of the sound effect as the audio reproduction time information of the sound effect.

Figure 18:
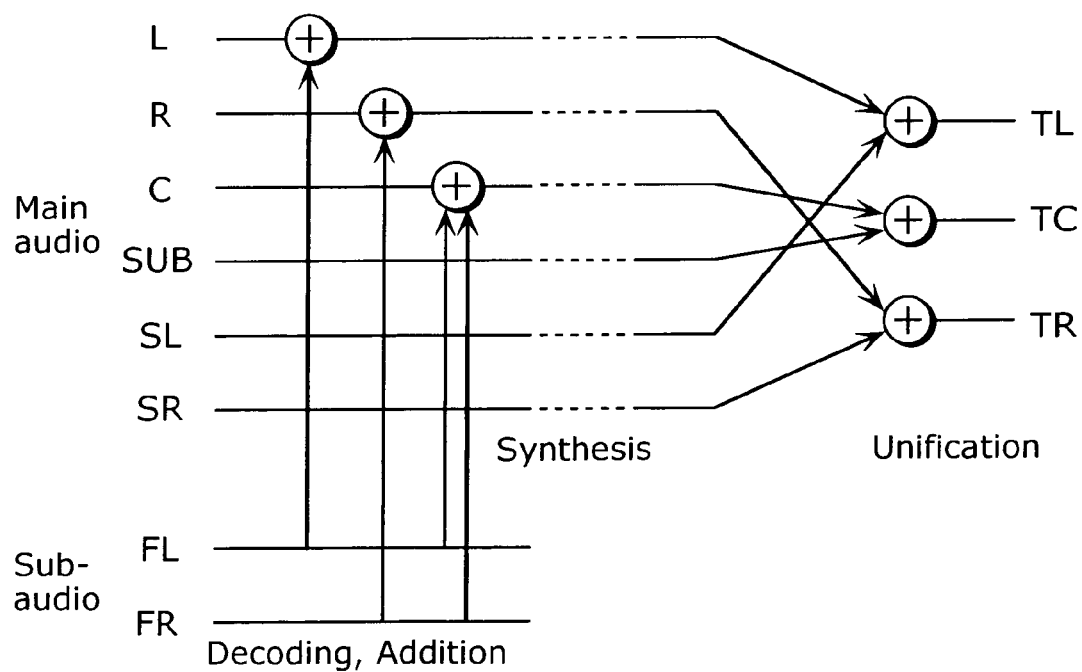
FIG. 18 is a diagram for explaining the synthesis and unification of the audio signal.

Also, as shown in FIG. 18, in the case where the sub-audio of 2 ch is synthesized with the main audio of 6 ch, (1) the front left (FL) ch signal of the sub-audio is added to the left (L) ch signal and the center (C) ch signal of the main audio, and (2) the front right (FR) ch signal of the sub-audio is added to the right (R) ch signal and the center (C) ch signal of the main audio. As a result, the main audio and the sub-audio, even if different in the number of channels, can be synthesized. As of the time point of this synthesis, the audio signal is a 5.1 ch signal. In the case where this audio signal of 5.1 ch is required to be unified to 3 ch due to the limitation of the output speed, for example, i.e. it is outputted at 3 ch of TL, TR and TC, then the main audio signal is so processed that, for example, L and SL of the synthesized voice are unified into the unified voice TL. Similarly, R and SR of the synthesized voice is unified into the unified voice TR, and C and SUB of the synthesized voice into 3 ch of TC of the unified voice.

Figure 19:
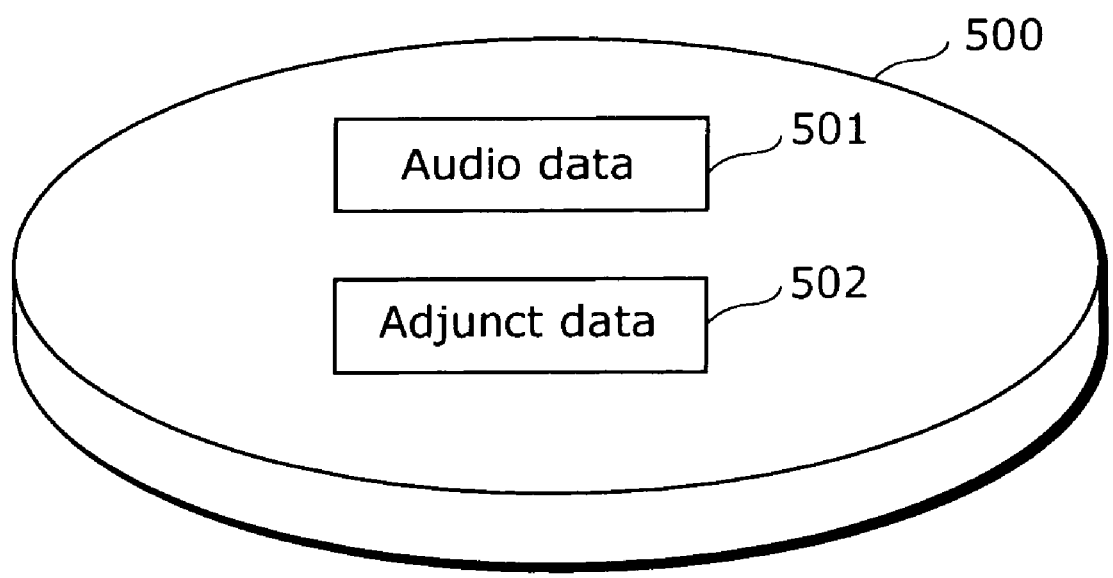
FIG. 19 is a diagram showing the DVD in which plural audio signals are recorded.

Further, in the case where plural audio signals capable of being synthesized are recorded in the DVD, as shown in FIG. 19, the DVD 500 may have recorded therein plural pieces of audio data 501 and the adjunct data 502. The adjunct data are information for specifying the number of channels, the coding scheme, the sampling rate, the voice reproduction section of each audio signal, or the like. The adjunct data may also contain the addition ratio information or the added channel information. Also, it can contain the information specifying the starting time of the sub-audio. As a result, the audio reproducing apparatus can easily synthesize or unify plural voices.

Also in the case where the audio data 501 and the adjunct data 502 are downloaded from the network and stored in the storage unit such as a hard disk in the apparatus, as in the case described above, plural audio signals can be synthesized and reproduced.

Second Embodiment

The configuration of the audio reproducing apparatus and the audio reproducing method according to the second embodiment are explained below mainly with reference to the block diagram of FIG. 8 showing the configuration of the audio reproducing apparatus according to the second embodiment.

According to the first embodiment, a method of realizing the AV synchronization of plural voices and plural images based on the system time clock STC was explained. On the other hand, according to the second embodiment, as a method of AV synchronization, the audio reproducing apparatus synchronizes the AV signals in such a manner that plural audio signals are separated from the inputted compressed audio data, each audio reproduction time information is read out, the main audio signal is decoded based on the audio reproduction time information of one of the audio signals, and the audio reproduction time information of the other audio signal is decoded in accordance with the audio reproduction time information of the main audio signal.

Up to now, the voice synthesis and the synchronization method at the normal reproduction rate have been explained. The voice synthesis and the synchronization method for variable speed reproduction such as rapid reproduction (for example, double speed reproduction) are explained below.

In the case where the audio decoder has the processing capacity more than the normal reproduction speed and the ability to process the audio output reproduction at variable speed, the mutual synchronization can be secured by decoding the audio reproduction time information of the other audio signal in accordance with the original audio reproduction time information based on the audio reproduction time information at the time of reproduction when the audio decode operation of one of the audio signals is processed at variable speed.

Figure 20:
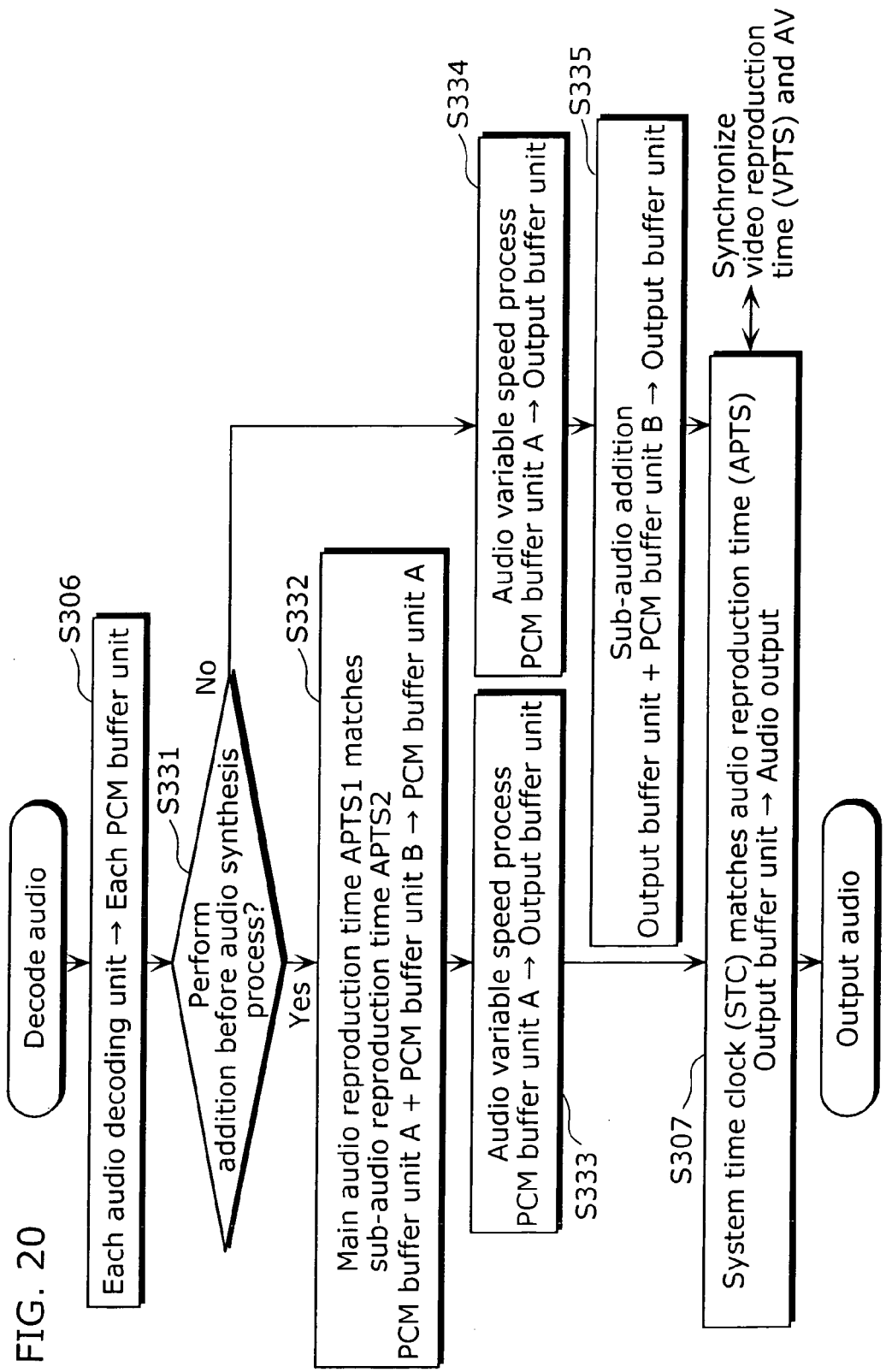
FIG. 20 is a flowchart showing the process of audio synthesis by adding the sub-audio to the main audio before or after the variable speed process according to a second embodiment.

FIG. 20 is a diagram showing the flow of the process of voice synthesis and reproduction by selecting when the sub-audio is added to the main audio, before or after the variable speed processing after audio decode process. In step 306, the result of the audio decode operation is stored in the PCM buffer. In step 331, the time before or after the audio synthesis process is selected. The criterion is described later.

In the case where the time before the audio synthesis process is selected (Yes in step 331), assume that the audio reproduction time information of the main audio and the audio reproduction time information of the commentary sub-audio match each other in step 332 (within a tolerable output time difference, e.g. several tens of ms). The sub-audio such as the commentary is added to the main audio, and the audio variable speed process is executed in step 333. On the other hand, in the case where the time after the audio synthesis process is selected (No in step 331), the main audio is subjected to the audio variable speed process in step 334, after which the sub-audio is added to the main audio in step 335. In step 307, the voice obtained by adding the sub-audio to the main audio is outputted in synchronism with the video output.

Figure 21:
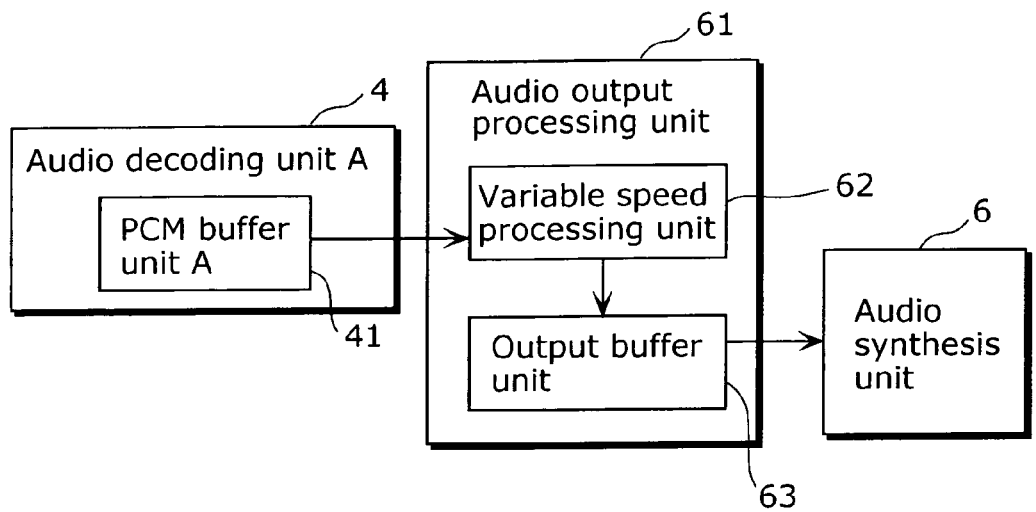
FIG. 21 is a block diagram for explaining the method of variable speed control by the audio output processing unit according to the second and third embodiments.
Figure 22:
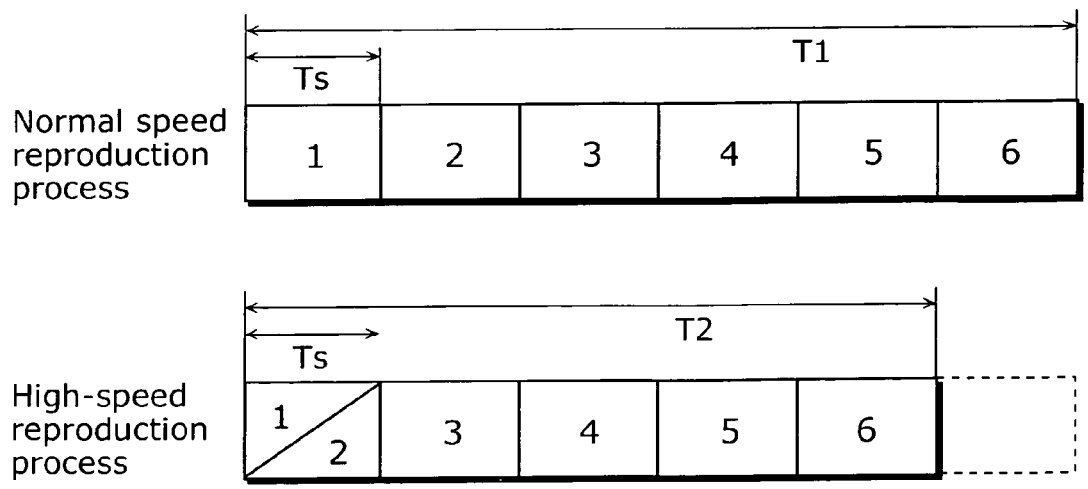
FIG. 22 is a diagram for explaining the principle of the audio variable speed process according to the second embodiment.

FIG. 21 is a block diagram for explaining the method of variable speed control operation of the audio output processing unit 61 according to the second embodiment. An example of the variable speed control operation for performing the reproduction speed conversion function shown in FIG. 22 is explained in detail below.

In FIG. 21, the audio signal from the PCM buffer unit A41 is inputted to the variable speed processing unit 62, and the variable speed process described below is executed. After that, the audio signal is provisionally stored in the output buffer unit 63, and outputted to the audio synthesis unit 6.

The variable speed reproduction can be implemented by any of several methods. A first method is to repeat the normal speed reproduction and the skip reproduction, and a second method is to actually execute the decode process at high speed.

First, the first method in which the normal reproduction and the skip reproduction are repeated is explained. Basically, this method is a skip reproduction process in which the portion at which the read position is skipped is cut and only the portion not skipped is reproduced. In executing the double speed reproduction, for example, all the audio frames are not reproduced but specified audio frames are skipped by the variable speed processing unit 62 in the audio output unit in such a manner that the reproduction time after the audio output process conversion is one half. In this way, the reproduced audio data is prepared and stored in the output buffer unit 63. Then, the value of the audio reproduction time information APTS corresponding to the audio frame portions to be reproduced is obtained.

On the other hand, in the video output unit, the synchronization information is acquired, and in order to output the video signal corresponding to the audio reproduction time information APTS, the AV synchronization is carried out by skipping the display of specified frames. Specifically, by executing the video display in synchronism with the audio reproduction time information APTS for the skip reproduction process by audio frame, the AV synchronization is carried out for the variable speed reproduction.

Another method is to read by skipping beforehand in the input unit 1. Only the stream after skip is inputted to the input unit 1, and therefore, the synchronization can be realized by reading the system reference time information such as the system time clock STC, the audio reproduction time information APTS and the video reproduction time information VPTS from the inputted stream. This is the same as the AV synchronization method for normal reproduction. After reproduction for 0.5 to about several seconds, however, the signal is skipped again so that an overall high-speed reproduction is realized.

Next, an explanation is given about a case in which the audio decode process is executed by the processing capacity at least for the normal reproduction speed processing to perform the variable speed process. After adding the other decode voice after the aforementioned audio decode process, the variable speed process can be executed. For example, after adding the sub-audio such as the commentary to the main audio, the variable speed process is executed by the audio output processing unit 61, and therefore the voice output is possible in which the added voice is also synchronized with the variable speed processing of the decoded voice.

On the other hand, the sub-audio can be added to the main audio after the variable speed process. After performing the variable speed process in the audio output processing unit 61, the sub-audio is added to the main audio. Even in the case where the decode voice is subjected to the variable speed process, therefore, the added sub-audio can be added as the normal speed voice.

First, the synchronous reproduction method at the time of high-speed decode processing is explained. The input unit 1 retrieves the data of at least the input speed required for normal reproduction and splits it into the video stream and the audio stream, after which the stream is stored in each buffer unit. As a result, plural video decoding units and plural audio decoding units are started. Each decoder performs the decode operation at not lower than the normal reproduction speed (effectively utilizing the supplied resources without resorting to the reproduction speed), and the result of decoding is stored in each frame buffer unit and each PCM buffer unit.

Since the variable speed process is executed, the audio decode processing capacity more than the normal reproduction speed process is required. To maintain the reproduction speed about 1.3 times higher, for example, the decode processing capacity about 1.5 times or somewhat higher than the reproduction speed is desirable. This applies not only to the decode processing capacity but also to the processing performance for reading from the reproduction media and the transfer processing capacity as well.

The decode operation is performed at high speed, and the audio data stored in the PCM buffer and the like are processed as follows. In FIG. 22, the upper side shows the data reproduced at normal speed before the variable speed process, and the lower side the data reproduced at high speed after the variable speed process. The upper side represents a case in which 6 audio frames (1 audio frame equals about 10 and several ms) are normally reproduced during the time T1. On the other hand, the lower side shows a case in which the first and second audio frames are reproduced at the same time, with the result that the 6 audio frames are reproduced during the time T2 which is about ⅚ of T1. The compression ratio is defined as the value obtained by dividing the time length after the process by the time length before the process. Then, the speed ratio is the inverse of the compression ratio. In this case, therefore, the high-speed reproduction 6/5 (1.2) times as high is involved.

In the process, one of the superposed audio frames reproduced is faded out while the other is faded in thereby to realize the superposition. Both are superposed at the normal reproduction speed. For the other audio frames not superposed, the reproduction is carried out at normal speed. In spite of the high-speed reproduction, all are reproduced at normal speed, and therefore the pitches of the original sound remain unchanged. As a result, the variable speed reproduction can be realized in such a manner as to hear the natural voice.

The audio coding scheme, the sampling rate, or the like may be different and therefore the audio frame size may be different between main audio and sub-audio. In the case where the audio frame size is different at the time of variable speed reproduction, both are not required to be synchronized exactly. As long as both have the same speed ratio and are reproduced in such a manner as to be synchronized during a predetermined reproduction time clearly defined, both can be synchronized as a matter of course.

As described above, in addition to the variable speed control operation carried out by the audio output processing unit 61, provision of a means in which, after adding another decode voice after the audio decode process, the variable speed process is executed or another decode voice is added after the variable speed process makes it possible to reproduce the added data voice at the same interval as the original sound.

Incidentally, the synchronization between the main reproduced voice and the sub-audio is as explained above. In the case where synchronization is taken before addition, the addition can be carried out with reference to PTS of another voice based on the PTS calculated originally for all the audio frames. On the other hand, in the case where the voice is added after the variable speed process, the rule should be laid down in advance as to which of the superposed audio frames has the PTS validated.

Also, in the case where a stream totally lacking the audio reproduction time information for the sub-audio is supplied or in the case where the simultaneous reproduction is carried out ignoring the reproduction time information, the synchronization with the main audio is lacking and therefore, basically, the audio reproducing apparatus can reproduce the currently reproduced main audio in such a manner as to maintain the continuity of reproduction. In this case, such as the sampling rate change, the addition value change and the output channel change can be carried out by a similar method to the embodiment described above.

As in the second embodiment, especially in the audio variable speed reproduction, the AV synchronous reproduction is facilitated by use of the audio reproduction time information APTS providing an audio reproduction reference time.

Further, with regard to the synchronization of a plurality images or voices, a determining unit for determining the contents of the reproduction stream is provided as an addition select means for reproduction and synthesis. Based on the result obtained by the determining unit, the time before or after the audio output process is selected as a timing for adding the audio information extracted from the data at the time of reproduction, or the time before or after the video output process can be selected for reproduction as a timing of adding the text or the character information extracted from the data.

For example, whether each output process in synchronism with audio and video signals should be carried out as in the subtitles on karaoke or the character information is outputted after each output process (without synchronization) as in the emergency broadcast can be selected in accordance with the contents of reproduction.

As an addition selector, a selector for selecting the specifics of the reproduction process from the contents of the instruction from the user is provided. Based on the result obtained by the selector, the time before or after the audio output process is selected as a timing of adding the voice information extracted from the data, or the time before or after the video output process is selected as a timing of adding the text or the character information extracted from the data for carrying out the reproduction.

For example, the addition can be selected in accordance with the instruction of the user as to whether the audio information and the character information are added to each other before or after the variable speed process.

To determine the timing of addition, a determining unit is provided to determine the contents of the stream to be reproduced and the application by the user. Based on the result from the determining unit, the time before or after the audio output process is selected as a timing of adding the audio information extracted from the data at the time of reproduction, or the time before or after the video output process is selected as a timing of adding the text or the character information extracted from the data for reproduction.

In the variable speed process of the karaoke contents, for example, the audio information and the character information are added before the variable speed process in response to an instruction of the user. In the interval change process for changing only the interval, however, the audio information and the character information are added after the interval change process. In this way, the addition before or after each output process can be selected taking the instruction from the user into consideration as well as the contents.

Third Embodiment

The configuration of the audio reproducing apparatus and the audio reproducing method according to the third embodiment is explained below mainly with reference to the block diagram of FIG. 8 showing the configuration of the audio reproducing apparatus according to the third embodiment and FIG. 21 showing the configuration of the audio output processing unit for the variable speed control operation.

The process performed by the audio output processing unit 61 is not limited to the variable speed reproduction process. For example, the process of changing the pitch of the decoded voice may be executed. The digital broadcast signal is received and recorded, and the stream coded at least from the audio signal is reproduced while securing the temporal synchronization in such a manner that after the audio decode process, the voice information extracted from the data is added and reproduced before or after the audio synthesis process in accordance with the synchronization information. Then, for example, the manner in which the added audio information is outputted can be changed by selecting whether the level of the interval of the original voice is changed in the audio output process after adding the sub-audio to the main audio or by adding the sub-audio after changing the level of the interval of the original main audio in the audio synthesis process.

Also, the audio output processing unit 61 can execute the acoustic effect process including the various surround effects. The surround effect is carried out after adding the sub-audio, or the sub-audio can be added after adding the surround effect. As a result, the expansion feeling of the sub-audio and the output speaker target can be changed. In addition, the delay setting effect, or the like taking the synchronization process delay between the video processing and the sound processing into consideration can be performed by the audio output processing unit 61. The configuration is such that the output delay of the video equipment and the audio equipment connected to each other can be set by the audio reproducing apparatus, and the setting can be determined as to whether the sub-audio is added before or after delay.

Fourth Embodiment

The configuration of the video reproducing apparatus and the is audio reproducing apparatus, the video reproducing method and the audio reproducing method according to the fourth embodiment are explained below mainly with reference to the block diagrams of FIGS. 7 and 8 showing the configuration of the video reproducing apparatus and the audio reproducing apparatus according to the fourth embodiment and the flowchart of FIG. 23 showing the method of synchronous reproduction of plural images according to the fourth embodiment.

The method of synchronizing plural audio signals based on the audio reproduction time information APTS is explained above. A method of synchronizing plural audio signals based on the video reproduction time information VPTS is explained below.

This method is intended to synchronize the audio signals by decoding the audio reproduction time information of the audio signals in accordance with the video reproduction time information of the main video signal. FIG. 23 is a flowchart showing the process in which after the video decoding unit A104 executes the decode process, the video decoding unit B105 selects whether the decoded video information is synthesized and reproduced before or after the video output process in accordance with the synchronization information. In step 305, the result of video decoding is stored in the frame buffer unit A141, and step 351 selects whether skip is made after or before video synthesis.

In the case where the skip is made after synthesis (Yes in step 351), the result of decoding by the video decoding unit B105 is stored in the frame buffer unit B151 (step 405). In the case where the reproduction time information of the video decoding unit A104 and the reproduction time information of the video decoding unit B105 match each other (within 33 ms, for example, in the tolerable output time difference) in step 352, the decode images are superimposed, after which the image skip output process is executed in step 353.

On the other hand, in the case where the skip is made before synthesis (No in step 351), the skip is made by the image skip process in step 354, after which the decode image of the reproduction time information of the video decoding unit B105 matching the reproduction time information of the video decoding unit A104 is superposed in step 355. Then, in step 308, an image is outputted in synchronism with the audio output.

In this way, after one video decode process, the time before or after the video output process is selected by the synchronization information for the other video decode operation and the image is synthesized and reproduced. For example, the manner in which the added image is outputted can be changed according to whether one image and the other image are outputted in synchronism with each other in the image skip output process after adding the other image to the decode image, or the other decode image is added after skip in the image skip process.

Also, unlike in the process shown in FIG. 23, after determining the time before or after the video synthesis process, the video skip process may be executed provisionally and the other decode image can be added to the image matching the video reproduction time information VPTS to be displayed. Specifically, the addition in which the time information before the video synthesis process matches is carried out in such a manner that the video skip process is executed, and only the decode image in which the video reproduction time information VPTS to be displayed matches the reproduction time information is selectively added and displayed. On the other hand, the addition in which the time information after video synthesis process matches is carried out in such a manner that after execution of the video skip process, the decode image is added and displayed without resorting to the video reproduction time information VPTS on display. In this case, after the video skip process, regardless of one of the video decode reproduction time information displayed, the reproduced image of the other video decode can be superposed.

This skip process corresponds to such as the high-speed I reproduction for reproducing the I picture and skipping the P and B pictures and the IP reproduction for skipping only the B picture. In these processes, the data of the B picture is disposed of in the input unit 1 or after decoding, for example, thereby to prevent the B picture from being reproduced. As a result, the reproduction time information for image reproduction of the B picture is eliminated. At the time of high-speed reproduction with such as a skip, therefore, the reproduction time information of a finally outputted image becomes effective.

The output from each frame buffer unit is added in the image synthesis unit 106, after which the result of addition is outputted in video signal. In the skip process, in the absence of the auxiliary image data such as the commentary corresponding to the video reproduction time information VPTS of the video frame to be outputted, the process stands by until the frame output time synchronized with the next data without any addition process. In the case of the NTSC system, about 30 images are outputted per second, and therefore each PTS time difference is about 33 ms. In the case where the video reproduction time information VPTS is used as a reference, the synchronization is determined and such as the images can be superposed within the time difference of ±16.5 ms. Incidentally, the audio synthesis of the PCM buffer unit between the main audio data and the sub-audio such as the commentary can be also synchronized on the same principle. In this case, however, the synchronization is determined and the synthesized sound can be generated in the case where the difference is within the accuracy of not more than 10 and several ms per audio frame (several ms to several tens of ms depending on the difference of the audio compression scheme).

Incidentally, in the absence of the video or audio time information required for synchronization, the PTS value on display or on issue in sound is referred to and converted into the reproduction time information. Then, by setting it as the time when the video data and the audio data are synchronized with each other, the data synthesis can be carried out by the same method as the normal synchronous reproduction.

Now, assume a case where an image is edited mainly seamlessly, such as a case where a recorded program is edited or the like. In this case, although the images after edition are connected continuously, the sound is often discontinuous. This is the feature of the edition by MPEG and due to the fact that the image and sound are not coded simultaneously by exactly the same scheme. In the case where the image is emphasized, therefore, the audio continuity cannot be maintained, while in the case where the audio signal is emphasized, the image continuity cannot be maintained. In view of this, it is preferable that mainly at the time of seamless reproduction of an image, the synchronization of video and audio is performed in such a manner that the audio reproduction time information APTS matches the corresponding video reproduction time information VPTS based on the particular reproduction time information VPTS so as to reproduce the audio.

On the other hand, at the time of seamless reproduction mainly for editing the audio signal seamlessly, the synchronization is desirable in such a manner as to reproduce the image having the video reproduction time information VPTS in keeping with the audio reproduction time information APTS based on the particular audio reproduction time information APTS.

A method described below is available for seamless reproduction while maintaining the continuity of both video and audio signals at the time of seamless reproduction. First, images are mainly edited in seamless fashion. The audio reproduction for the image before the junction is conducted up to the last reproduction time before the seamless junction in one audio decoding unit A4. Next, in another audio decoding unit B5, the audio decode operation is performed at the first image reproduction time at the next seamless junction in preparation for the sound output at the synchronous time. In accordance with the video reproduction time information for seamless video reproduction, the two decode sounds are switched for reproduction. In the case where the audio fading process is executed as required, noises due to the phase difference before and after the junction are generated less. In the case where the continuous reproduction of only the main audio is emphasized at the time of this seamless reproduction, the synthesis of the sub-audio is prohibited and the sub-audio audio decode process is stopped. In this way, plural audio decoding units can be used for seamless reproduction of the main audio. The provision of the three audio decoding units makes it possible to secure one of them for sub-audio decoding and the others for main audio decoding and the seamless processing. The provision of still another audio decoding unit makes it possible to secure the seamless application of the sub-audio and reproduce the sub-audio in seamless fashion.

On the other hand, assume that the image processing unit 160 is provided for synthesizing the image in the image synthesis unit 106 after video decoding. In the case where the output size change such as enlargement or reduction in the synthesis screen is set after decoding and a sub-screen is synthesized, then the selection is possible as to whether the sub-screen is synthesized after reduction or a specified portion is cut out and enlarged. The selection of such as partial enlargement or reduction of the original screen is also possible. The other estimated possible processes include the conversion from high to low resolution or the reverse conversion of the resolution format (for example, the conversion from the standard resolution of 480I to the high image equality resolution of 1080I) in keeping with the output TV monitor, various format conversions such as the output format conversion of the letter box and the side panel and the frequency format conversion between NTSC and PAL systems, and such as the IP conversion from the interlace image quality to the progressive image quality. The shown order of these items is not necessarily true. Also, with regard to the format conversion, plural times of format conversion (for example, the resolution format and the output format) may be carried out at the same time. Incidentally, in the case where two images are synthesized and one of the images is of NTSC type and the other of PAL type or one is an image of standard image quality and the other is an image of high quality, for example, they are desirably set to the same format in advance to facilitate the synthesis.

Also, these superposed images are displayed with a GUI image or the like attached thereto to aid the user in the operation on the image, and therefore may be desirably synthesized in a screen size suitable for menu arrangement on the GUI screen. In the case where such a configuration is employed in which the main image is displayed on the background screen on which a commentary image in a sub-screen is superposed, on which a transparent menu screen for setting various screens is superposed, then the user can easily confirm the image effect in accordance with the set menu.

Also, according to the US broadcast system, the subtitle is called the closed caption signal, and the specification provides that the subtitle is switched between display and non-display by the remote control operation of the user. In an application to this embodiment, therefore, the selection of the addition and display of each output process in response to an instruction of the user is desired. Further, assume that also in the case where the characters of the subtitles and such are scrolled vertically or horizontally or wiped with various display effects, for example, the time before or after the various output processes can be selected. In rapid feed mode, therefore, the inconveniences in which important information is overlooked or the display cannot be transferred to the next screen unless the entire subtitle is visually confirmed are eliminated. These subtitles and examples similar to the subtitles include the Teletext in Europe as well as the closed caption in the U.S.

Further, in the case where the subtitle data and audio data can be selectively reproduced from the data of the satellite digital data broadcast, the setting is made possible in which the audio information extracted from the stream data in data broadcast can be added before the audio output process while the character information is, for example, added after the video output process, or otherwise each information can be added separately.

The provision of a determining unit to determine the type and specifics of the reproduction contents of each of these streams makes it possible, depending on the result obtained by the determining unit, to reproduce the audio information extracted from the data selectively before or after the audio output process, or to reproduce the text or the character information extracted from the data, selectively before or after the video output process. As a result, the same reproduction method can be used without specifying the input or the reproduction medium.

A configuration in which the time before or after the addition can be selected by the function of the audio and video output process can be used for plural output processes including the variable speed process by adding a sub-screen after enlarging the screen.

Also, a configuration, in which the additional sound such as buzzer, the after-recording sound for adding plural recorded sounds and the mike echo sound for adding the mike echo to the accompaniment such as in karaoke other than the sub-audio can be selectively added before or after the audio output process, can produce the same effect as that described above. Further, a configuration in which the subtitle, the character superposition and such as the desired characters and figures inserted by individuals at the time of editing work in other than the sub-screen can be selectively added before or after the video output process can produce a similar effect. This can be realized by mounting a dedicated audio arithmetic element or digital signal processor (DSP) or using a high-performance CPU.

Although the input data is explained above as data inputted from an external source or data inputted from an external recording medium, the data existing in the devices can alternatively be used.

The foregoing description concerns a case in which the input data is divided into a video signal and an audio signal by the input unit 1. Nevertheless, the video signal and the audio signal may be file data separated in advance. A configuration, in which the reproduction time information related to the compressed video data, the compressed audio data and the reproduction time information are supplied, and using each reproduction time information, the compressed video data and the compressed audio data can be reproduced in synchronism with each other, can configure an audio reproducing apparatus according to the audio reproducing method embodying the present invention. This is applicable to all the cases in which the reproduction time information related to the compressed video data, the compressed audio data and the reproduction time information and the data on the file are reproduced in synchronism with each other, either for a mixed file of AV and data or an independent file of AV data, as the result of editing the signal imaged by a video camera or the like on a personal computer.

Applications of these data reproducing method and apparatus include a set-top box, a digital satellite broadcast receiver with a recording device, a DVD player or a DVD recorder, a VCD-related device, hard disk recorder and a personal computer. By preparing the AV reproduction program by the audio reproducing method according to the present invention, an operation program can be loaded from an external source to the personal computer or the like and while synthesizing the sound or image, the AV synchronization can be performed.

Incidentally, a part or the whole of the units shown in FIG. 2 can be implemented in one integrated circuit (integration chip). Also, a part or the whole of the units shown in FIG. 7 can be realized in one integrated circuit (integration chip). Further, a part or the whole of the units shown in FIG. 8 can be realized in one integrated circuit (integration chip). Also, a part or the whole of the units shown in FIG. 12 can be realized in one integrated circuit (integration chip). Furthermore, a part or the whole of the units shown in FIG. 21 can be realized in one integrated circuit (integration chip).

INDUSTRIAL APPLICABILITY

The audio reproducing method and the audio reproducing apparatus according to the present invention, by using a means for mixing plural audio signals by changing such as the sampling rate in spite of different coding schemes based on the synchronization signal of plural coded digital audio signals, can find applications in such fields as the insertion and reproduction of the sub-audio such as the commentary and the auxiliary image for complementing the contents of the main audio and the main image without suspending the reproduction of the main audio and the main image.

The invention claimed is:

1. An audio reproducing apparatus which reproduces an audio signal and outputs the reproduced audio signal, said audio reproducing apparatus comprising:
    a synchronization unit operable to allocate, on a time axis, plural pieces of audio reproduction time information of a main audio signal and a sub-audio signal, the plural pieces of the audio reproduction time information of the main audio signal and sub-audio signal being respectively allocated in a manner which maintains a difference between reproduction times indicated by adjacent pieces of the audio reproduction time information of the main audio signal and sub-audio signal so as to synchronize the main audio signal and sub-audio signal; and
    a synthesis unit operable to synthesize the main audio signal and sub-audio signal using the plural pieces of audio reproduction time information allocated on the time axis,
    wherein a time when reproduction of the main audio signal is started is different from a time when reproduction of the sub-audio signal is started, and
    the sub-audio signal is reproduced in accordance with a piece of the audio reproduction time information of the sub-audio signal in the case where the piece of the audio reproduction time information of the sub-audio signal is present, and the sub-audio signal is reproduced in accordance with a piece of the audio reproduction time information of the main audio signal in the case where a piece of the audio reproduction time information of the sub-audio signal is not present.

2. The audio reproducing apparatus according to claim 1, wherein the sub-audio signal is an audio signal which has plural reproduction sections.

* * * * *